US006576298B2

(12) United States Patent
Bennett et al.

(10) Patent No.: US 6,576,298 B2
(45) Date of Patent: Jun. 10, 2003

(54) LUBRICANT QUALIFIED FOR CONTACT WITH A COMPOSITION SUITABLE FOR HUMAN CONSUMPTION INCLUDING A FOOD, A CONVEYOR LUBRICATION METHOD AND AN APPARATUS USING DROPLETS OR A SPRAY OF LIQUID LUBRICANT

(75) Inventors: Scott Bennett, Stillwater, MN (US); Kim Person Hei, Baldwin, WI (US); Minyu Li, Oakdale, MN (US); Amy Haupert, St. Paul, MN (US); Keith D. Lokkesmoe, Savage, MN (US)

(73) Assignee: Ecolab Inc., St. Paul, MN (US)

( * ) Notice: Subject to any disclaimer, the term of this patent is extended or adjusted under 35 U.S.C. 154(b) by 0 days.

(21) Appl. No.: 09/838,969

(22) Filed: Apr. 20, 2001

(65) Prior Publication Data

US 2002/0051850 A1 May 2, 2002

Related U.S. Application Data

(63) Continuation-in-part of application No. 09/738,387, filed on Dec. 15, 2000, now abandoned.
(60) Provisional application No. 60/230,662, filed on Sep. 7, 2000.

(51) Int. Cl.$^7$ ................................................ B05D 1/02
(52) U.S. Cl. ...................... 427/424; 118/13; 118/21; 118/24; 118/70; 118/300; 118/304; 118/313; 118/324; 118/325
(58) Field of Search .................. 118/13, 21, 24, 118/70, 300, 304, 313, 324, 325; 427/421, 424, 348, 377

(56) References Cited

U.S. PATENT DOCUMENTS 3,811,921 A  5/1974  Crawford et al.
3,853,607 A  12/1974 Iyengar et al.
4,053,076 A  10/1977 Vogel et al.

(List continued on next page.)

FOREIGN PATENT DOCUMENTS

JP  SHO 57-3892   1/1982
WO  WO 98/56881   12/1998
WO  WO 00/01979   1/2000

OTHER PUBLICATIONS

U.S. Ser. No. 60/149,095 filed Jun. 16, 1999.
U.S. Ser. No. 60/149,048 filed Aug. 16, 1999.
U.S. Ser. No. 09/596,599 filed Jun. 16, 2000.

(List continued on next page.)

*Primary Examiner*—Bernard Pianalto
(74) *Attorney, Agent, or Firm*—Merchant & Gould P.C.

(57) ABSTRACT

The interface between a moving conveyor belt and a work piece can be lubricated using an air driven stream of finely divided droplets of a lubricant composition. Droplets of a preferred size are directed by the air stream onto the conveyor with little waste of lubricant off the conveyor. The lubricant provides a very low coefficient of friction and little or no stress cracking in the containers. Using a low pressure and low flow rate air stream in conjunction with a low flow rate liquid lubricant attains the useful particle size in the lubricant add on spray. The liquid lubricant is sheared by the effect of the air flow creating the desirable droplet size and pattern of lubricant on the conveyor. A food container conveyor device having improved lubricant properties can be lubricated using a lubricant composition that can become ingested by a user from a food or a container for the food, can come into incidental contact or direct content with a food composition, can be incorporated at measurable concentrations into the food, or can be used generally on food conveyor surfaces wherein the food is exposed to the lubricant.

113 Claims, 6 Drawing Sheets

U.S. PATENT DOCUMENTS

| | | |
|---|---|---|
| 4,062,785 A | 12/1977 | Nibert |
| 4,069,933 A | 1/1978 | Newing |
| 4,143,181 A | 3/1979 | Cahn et al. |
| 4,478,889 A | 10/1984 | Maruhashi et al. |
| 4,486,378 A | 12/1984 | Hirata et al. |
| 4,506,763 A | 3/1985 | Frost et al. |
| 4,515,836 A | 5/1985 | Cobbs, Jr. et al. |
| 4,525,377 A | 6/1985 | Nickel et al. |
| 4,529,131 A | 7/1985 | Rutz |
| 4,534,995 A | 8/1985 | Pocock et al. |
| 4,538,542 A | 9/1985 | Kennon et al. |
| 4,543,909 A | 10/1985 | Sharpless |
| 4,569,869 A | 2/1986 | Kushida et al. |
| 4,573,429 A | 3/1986 | Cobbs, Jr. et al. |
| 4,632,053 A | 12/1986 | Villanueva et al. |
| 4,648,486 A | 3/1987 | Kayser et al. |
| 4,690,299 A | 9/1987 | Cannon |
| 4,713,266 A | 12/1987 | Hasegawa et al. |
| 4,714,580 A | 12/1987 | Maruhashi et al. |
| 4,851,287 A | 7/1989 | Hartsing, Jr. |
| 4,874,647 A | 10/1989 | Yatsu et al. |
| 4,897,203 A | 1/1990 | King |
| 4,919,984 A | 4/1990 | Maruhashi et al. |
| 4,486,378 A | 7/1990 | Hirata et al. |
| 4,980,211 A | 12/1990 | Kushida et al. |
| 5,001,935 A | 3/1991 | Tekkanat et al. |
| 5,115,047 A | 5/1992 | Hashimoto et al. |
| 5,238,718 A | 8/1993 | Yano et al. |
| 5,334,322 A | 8/1994 | Williams, Jr. |
| RE34,742 E | 9/1994 | Maier et al. |
| 5,371,112 A | 12/1994 | Sayre et al. |
| 5,391,308 A | 2/1995 | Despo |
| 5,509,965 A | 4/1996 | Harry et al. |
| 5,518,745 A | 5/1996 | Thota et al. |
| 5,538,654 A | 7/1996 | Lawate et al. |
| 5,565,127 A | 10/1996 | Laufenberg et al. |
| 5,573,819 A | 11/1996 | Nugent, Jr. et al. |
| 5,598,316 A | 1/1997 | Kasting, Jr. |
| 5,652,034 A | 7/1997 | Seiner |
| 5,658,619 A | 8/1997 | Kirschner et al. |
| 5,663,131 A | 9/1997 | Winicov et al. |
| 5,681,628 A | 10/1997 | Niederst et al. |
| 5,698,269 A | 12/1997 | Carlblom et al. |
| 5,721,023 A | 2/1998 | Ostapchenko |
| 5,728,770 A | 3/1998 | Yamamoto et al. |
| 5,783,303 A | 7/1998 | Tsuei |
| 5,789,459 A | 8/1998 | Inagaki et al. |
| 5,863,874 A | 1/1999 | Person Hei et al. |
| 5,876,812 A | 3/1999 | Frisk et al. |
| 5,935,914 A | 8/1999 | Theyssen et al. |
| 5,985,346 A | 11/1999 | Ayash |
| 6,086,351 A | 7/2000 | Thota et al. |
| 6,087,308 A | 7/2000 | Butler et al. |
| 6,102,161 A | 8/2000 | Gomez Diaz et al. |
| 6,103,308 A | 8/2000 | Floyd et al. |
| 6,129,202 A | 10/2000 | Layne et al. |

OTHER PUBLICATIONS

U.S. Ser. No. 09/595,835 filed Jun. 16, 2000.

U.S. Ser. No. 09/596,697 filed Jun. 19, 2000, now U.S. Pat. No. 6,207,622 issued Mar. 27, 2001.

U.S. Ser. No. 09/655,543 filed Sep. 6, 2000.

U.S. Ser. No. 09/655,544 filed Sep. 6, 2000.

U.S. Ser. No. 09/655,740 filed Sep. 6, 2000.

U.S. Ser. No. 60/230,662 filed Sep. 7, 2000.

U.S. Ser. No. 09/731,118 filed Dec. 6, 2000.

U.S. Ser. No. 09/738,387 filed Dec. 15, 2000.

U.S. Ser. No. 09/745,296 filed Dec. 20, 2000.

U.S. Ser. No. 09/840,365 filed Apr. 23, 2001.

"Coke mops up the mess", http://cnnfn.cnn.com/1999/06/24/worldbiz/coke_damage, last updated Nov. 15, 2000, 4 pages.

"Coke Pulled In Belgium, Luxembourg, Netherlands—Over 100 Poisoned", http://www.sightings.com/politics2/coke-.htm, last updated Nov. 15, 2000, 3 pages.

Du Pont Krytox® Brochure, "Krytox® Dry Film Lubricants", pp. 1–6 (Nov. 1997).

"Encyclopedia Of Chemical Technology, Fourth Edition, Flavor Characterization to Fuel Cells", *John Wiley & Sons*, vol. 11, pp. 621–644 (Date Unknown).

"FDA and EPA Status", 3 pages (no date).

Fiske Brothers Refining Co., http://www.lubriplate.com, last updated Nov. 15, 2000, 1 page.

Gower et al., "Handbook of Food Additives", pp. 798, 800, 811, 812, 826, 830, 831, 833, 834, 835, 837, and 846 (1995). (No month avail).

Interflon "Fin Food Lube A1" Brochure, 20 pgs., (Date Unknown).

Interflon®, http://www.interflon.nl/engels.htm, last updated Jun. 18, 1999, pp. 1–10.

"Klenz–Glide® 5 Food Grade Lubricant", Klenzade® Division of Ecolab, 5 pages (1997). (No month avail.).

"Left in Limbo Food–grade lubricant manufacturers continue search for regulatory replacement for USDA", *Journal of the Society of Tribologists and Lubrication Engineers*, pp. 11–13 (Sep. 2000).

Moskala, E., "Environmental Stress Cracking in PET Beverage Containers", pp. 8–1–8–15 (1996). (No month avail).

Moskala, E., "Environmental Stress Cracking in PET Carbonated Soft Drink Containers", pp. 51–70 (1998), (No month avail).

Southwestern Petroleum Corporation, http://swepcousa-.com/lubesite/products/115.htm, last updated Nov. 15, 2000, 1 page.

Synco Chemical Corporation, http://www.super–tube.com, last updated May 5, 1999, 5 pgs.

Tekkanat, B. et al., "Environmental Stress Cracking Resistance of Blow Molded Poly(Ethylene Terephthalate) Containers", *Polymer Engineering and Science*, vol. 32, No. 6, pp. 393–394 (Mar. 1992).

Title 21—Food and Drugs, 21 CFR 182.1, 2 pages (Mar. 15, 1977).

Title 21—Food and Drugs, 21 CFR 178.3570, 5 pages (Mar. 15, 1977).

Title 21—Food and Drugs, 21 CFR 172.5, 1 page (Mar. 15, 1977).

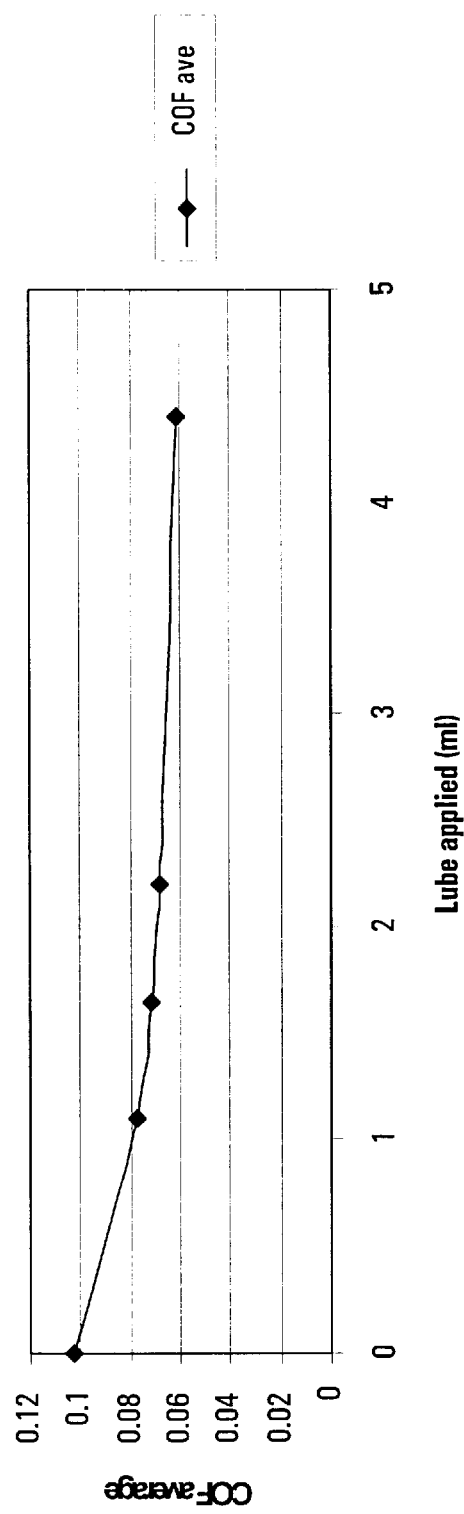

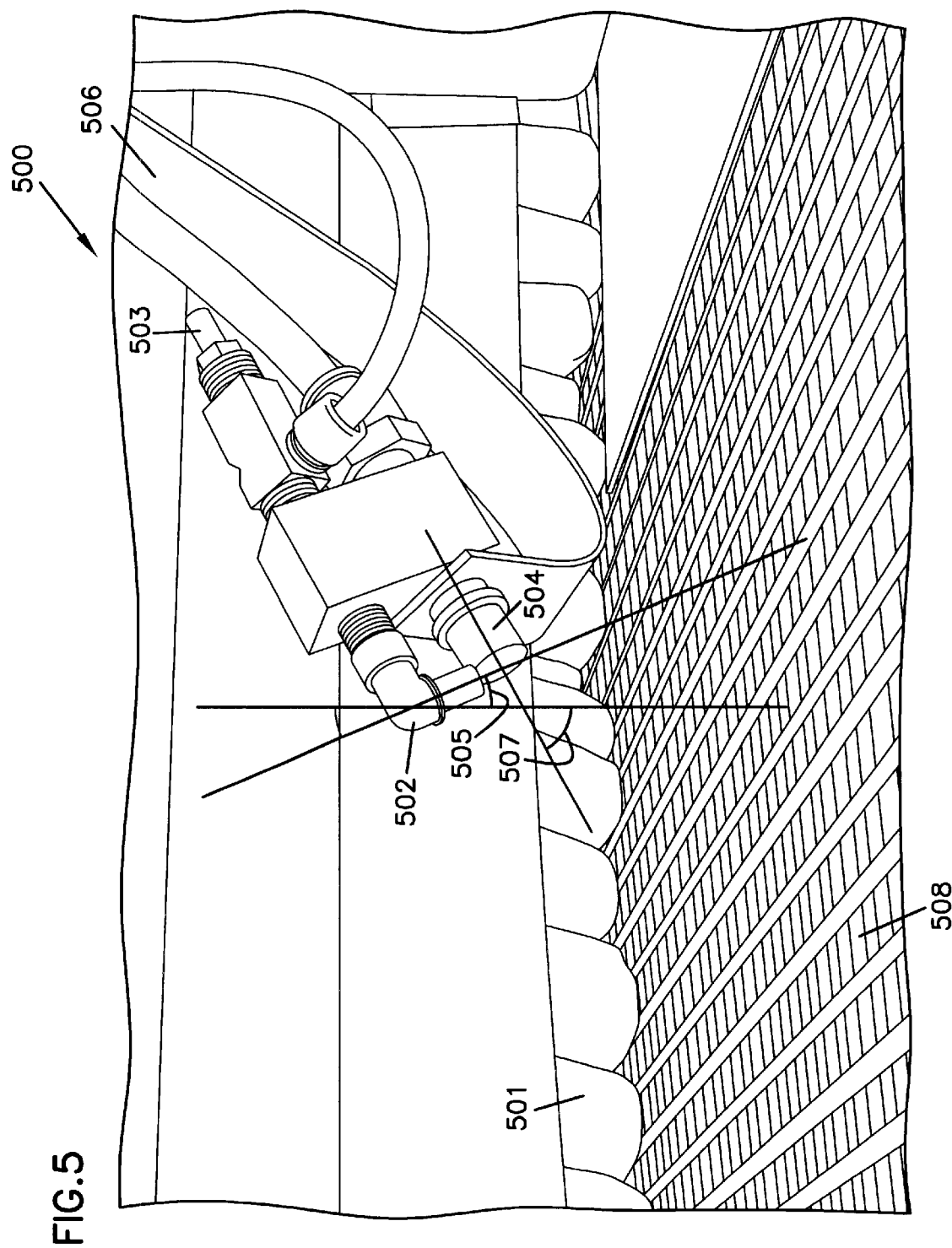

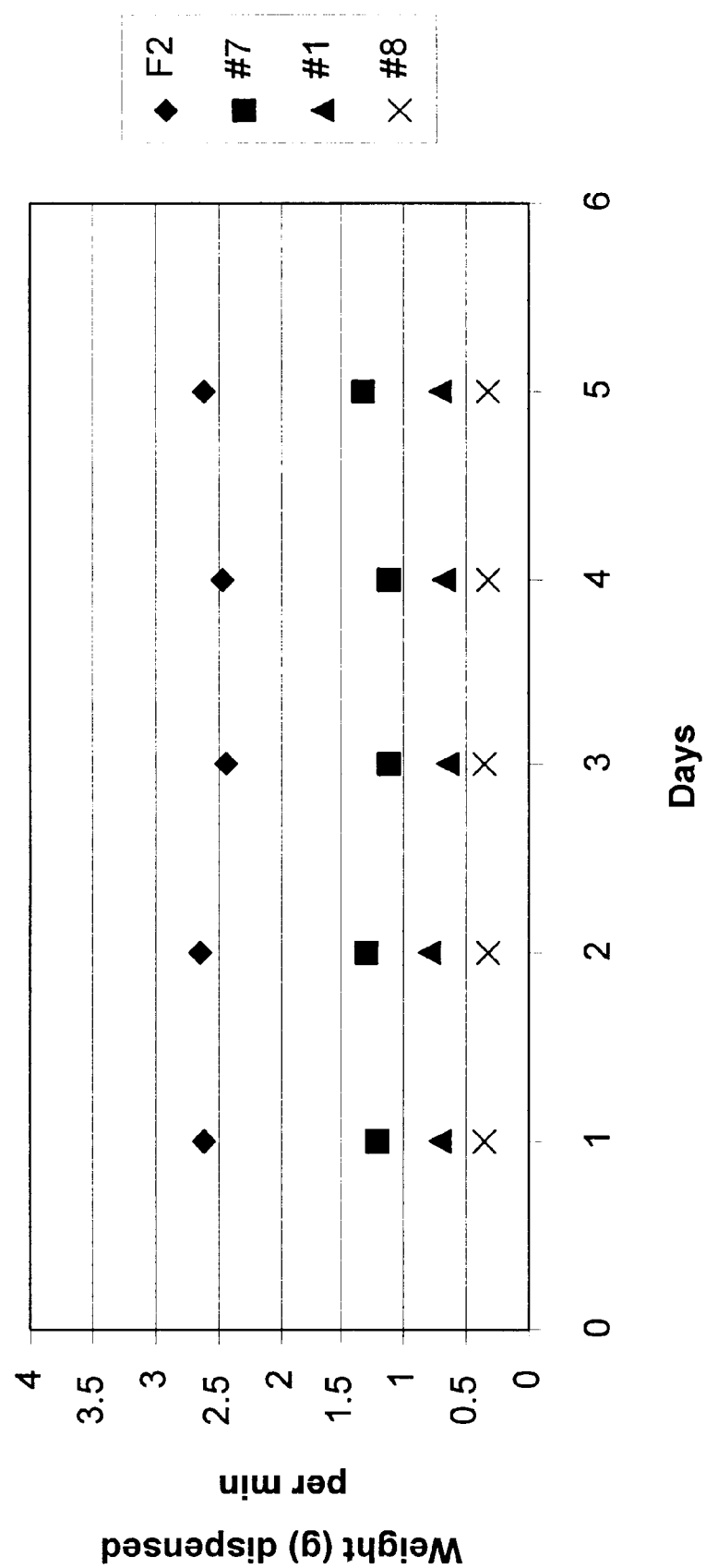

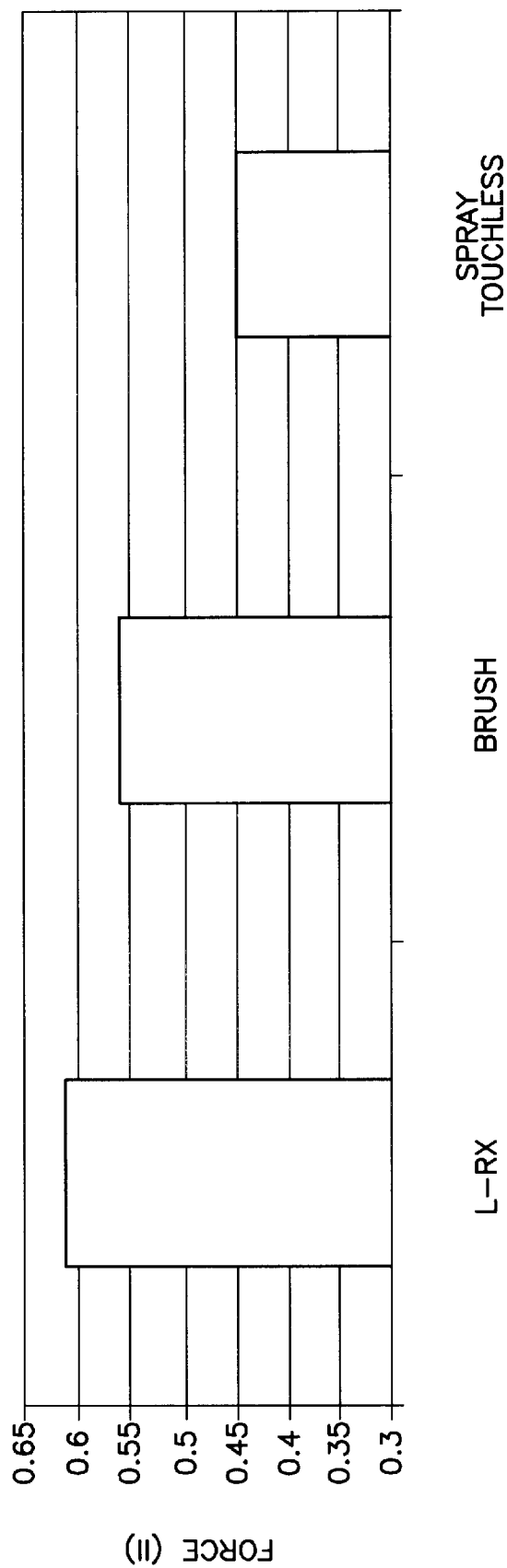

LUBRICANT QUALIFIED FOR CONTACT WITH A COMPOSITION SUITABLE FOR HUMAN CONSUMPTION INCLUDING A FOOD, A CONVEYOR LUBRICATION METHOD AND AN APPARATUS USING DROPLETS OR A SPRAY OF LIQUID LUBRICANT

This application claims priority under 35 U.S.C. §119(e) to U.S. provisional application Ser. No. 60/230,662, filed on Sep. 7, 2000, incorporated by reference herein. This application is also a continuation in part of U.S. Ser. No. 09/738,387, filed on Dec. 15, 2000 abandoned.

FIELD OF THE INVENTION

This invention related lubricants for food packaging lubricated packaging business methods and to lubricated food containers and lubricated and conveyor apparatus that can move the container or container plus food composition during production. Such conveyors typically move the containers to stations that incorporate the food composition into the container and then further direct the container or food and container to stations that can clean the container, apply labels, seal or package the container for further shipment. The invention related to lubricating conveyors that support and transport work piece. The invention related to methods of use, for example, to treat or lubricate a container(s) and conveyor surfaces or system for containers. Containers can be made of glass, metal or plastic. The container is, for example, a food or beverage container. More particularly, the invention related to a conveyor system for transporting both empty and filled polyester beverage containers of various sizes.

BACKGROUND OF THE INVENTION

In commercial container filling or packaging operations for foods, beverages and other materials, the containers typically are moved by a conveying system at very high rates of speed. In current bottling operations, copious amounts of aqueous dilute lubricant solutions (often based on ethoxylated amines or fatty acid amines) are typically applied to the conveyor. These lubricant solutions permit high-speed operation (up to 1000 containers per minute or more) of the conveyor and limit marring of the containers or labels, but also have some disadvantages. For example, aqueous conveyor lubricants based on fatty amines typically contain ingredients that can react with spilled carbonated beverages or other food or liquid components to form solid deposits. Formation of such deposits on a conveyor can change the lubricity of the conveyor and require shutdown to permit cleanup. Further, aqueous lubricants are typically used in high volumes resulting in high cost and wastage of lubricant compositions from the conveyor surfaces. Such means to apply the liquid lubricant can create a splash, stream, mist or other directed liquid mass that can contact the food in a container or remain on the container and result in a concentration of lubricant in the food. Consumption of the food or contact with the container can result in the ingestion of the lubricant residue form the food or container.

These commercial aqueous conveyor lubricants, conventionally based on fatty acids, anionic surfactants, ethoxylated amines or fatty amines, are not currently qualified for contact or indirect contact with food. Any contact between food and lubricant can render the food unfit for human consumption under current FDA regulations including for example 21 CFR §§1.172, 1.178 and 1.182. These regulations also define "food grade" additive materials. Further, such lubricants typically contain ingredients that can promote microbes or can react with spilled carbonated beverages or other food or liquid components to form unwanted solid deposits.

When first used with beverage containers, such conveyor systems were lubricated using dilute aqueous lubricant materials, typically, substantially soluble sodium salt of the fatty acid or sodium salt of linear alkane sulfonate which acted to both lubricate and at least to some degree, clean the conveyor surfaces. Representative examples of such lubricants are found in Stanton et al., U.S. Pat. No. 4,274,973 and Stanton, U.S. Pat. No. 4,604,220. Many current conveyor lubricant systems are classified H-2 according to regulations in 21 CFR §§1.172, 1.178 and 1.182. Such systems are not approved for incidental, indirect or direct contact with beverage compositions. Any contact between H-2 lubricant materials and foods that incorporates any important amount of lubricant into beverage renders the beverage unsuitable for human consumption. Significant problems have arisen when H-2 lubricants have come into contact with food materials. When the food materials, often beverages or other comestibles have been contaminated with such H-2 lubricants, recalls of these materials have occurred resulting in substantial loss to the manufacturer. Because of the safety concerns and the potential of financial lawsuit to manufacturers, the use of H-2 lubricants can often pose substantial operating costs and administrative costs including regulatory review personnel insurance and other costs not directly related to the costs of lubricating conveyor lines and the costs of maintaining food purity. Accordingly, a substantial need exists in the art to obtain lubricants that can be used in a way on lubricating lines and with respect to containers and containers containing food such that the food can come into incidental, indirect or direct contact with lubricating compositions without rendering the food unfit for human consumption.

More recently a series of substantially soluble aqueous lubricants were introduced including Rossio et al., U.S. Pat. Nos. 4,929,375 and 5,073,280; and Wieder et al., U.S. Pat. No. 5,009,801. These patents assert that certain substituted aromatic compounds, certain couplers and saponifying agents and certain amine compounds can inhibit stress cracking in appropriately formulated materials. Other patents, including Person Hei et al., U.S. Pat. Nos. 5,863,874 and 5,723,418; Besse et al., U.S. Pat. No. 5,863,871; Gutzmann et al., U.S. Pat. Nos. 5,559,087 and 5,352,376; Liu et al., U.S. Pat. No. 5,244,589; Schmitt et al., U.S. Pat. No. 5,182,035; Gutzmann et al., U.S. Pat. No. 5,174,914; teach various conveyor lubricants and methods that provide adequate lubrication, cleaning and inhibit stress cracking. Lubricating solutions are often used on conveying systems during the filling of containers with, for example, beverages.

Conventional lub concentrate and diluted lubricants are commonly applied to moving conveyor belts using application equipment typically including nozzles that deliver about 1 to about 5 gallons of lubricant per hour of operation. Often, two or more of the nozzles are placed along the path of the conveyor to maintain sufficient lubricant on the conveyor for effective operations. Such a spray volume and viscosity results in the add-on of substantial volumes of lubricant. A substantial proportion of the lubricant drains from the conveyor surface and ultimately accumulates on surfaces underneath the conveyor, most commonly on the floor of the bottling facility. Such operations result in substantial product wastage, concerns with respect to the biocompatibility of effluents in sanitary drains, foam accumulation on containers, labels, unsafe slippery floors, substantial microbial growth and an overall undesirable aspect.

There are a number of different requirements for such lubricants. For example, the lubricant should provide an acceptable level of lubricity for the system and not adversely affect the conveyor or container. In the beverage industry, the lubricant must be compatible with the beverage so that it does not form solid deposits when it accidentally contacts spilled beverages on the conveyor system. This is important since the formation of deposits on the conveyor system may change the lubricity of the system and could require shutdown of the equipment to facilitate cleaning. The lubricant must be such that it can be cleaned easily. The container and/or the conveyor system may need to be cleaned. Since water is often in the cleaning solution, ideally the lubricant has some water soluble properties.

Currently, containers, including polyethylene terephthalate (PET) bottles, and conveying systems for containers are often contacted with a volume of a dilute aqueous lubricant to provide lubricity to the container so that it can more easily travel down the conveyor system. Many currently used lubricants are diluted at a ratio of about 1:100 with water are disadvantageous because they are incompatible with many beverage containers, such as PET and other polyalkylene terephthalate containers, and may promote stress cracking of the PET bottles.

Furthermore, aqueous based lubricants are in general often disadvantageous because of the large amounts of water used, the need to use a wet work environment, the increased microbial growth associated with such water-based systems, and their high coefficient of friction. Moreover, most aqueous-based lubricants are incompatible with beverages.

Flooding a conveyor surface with a substantial proportion of aqueous lubricant typically occurs on food container filling or beverage bottling lines. Sufficient lubricant is used such that the lubricant is not retained entirely by the surface of the conveyor but tends to flow from the surface of the container, drip onto a conveyor support members and the surrounding environmental area around the conveyors. Further, sufficient amounts of lubricant are applied to the conveyor and other mechanisms of the plant under such conditions that a substantial foam layer of lubricant can form on the surface of the conveyor. As much as one inch (about 2.5 cm or more) thick of lubricant foam can contact a substantial portion of the base of a food container such as polyethylene terephthalate beverage bottle. We have found that current methods of lubricating such containers are wasteful of the lubricant material since a substantial proportion of the materials is lost as it leaves the container surface. Further, substantial proportions of the lubricant remain on the container and are carried from the conveyor as the food packaging or beverage-bottling operations are continued. A substantial need exists for approved methods that waste little or no lubricant during packaging or bottling operations. Current lubricating methods for conveyors of beverage containers typically include flooding the conveyors with aqueous lubricants in relatively large add-on amounts. Such technology involves the high volume use of aqueous lubricants, a fairly high waste of the aqueous lubricant because the material tends to drip from the conveyor and contaminate the bottles.

In certain lubrication methods, liquid lubricants are added to a conveyor using a brush or high density felt cloth (see for example U.S. Pat. No. 6,102,161 or WO 00/01979) application means and method. Such brush or cloth application is associated with a reservoir or manifold containing the liquid lubricant that is added to the system. The lubricant flows through the applicator fibers and, where the fiber contacts the moving conveyor, is intended to apply a substantially continuous film of the lubricant to the conveyor surface. Such applicator usage results in wear and deformation on the applicator mechanism, can cause uneven add on, can be a location for the accumulation of substantial amount of dirt and microbial contamination and can cause other problems associated with worn applicator fiber.

A substantial need exists for improved lubricating methods commonly used in the food or beverage industry. Preferably, the dispensing system of a useful improved lubricant employs relatively low volume nozzle application that is applied in a fashion that sufficient lubricant is applied to the conveyor without wastage. Such operations result in low lubricant dosage on the containers and conveyor, minimal lubricant consumption, reduced wastage of the lubricant and minimal foam accumulation, little overspray, use of viscous materials that reduce dripping, reduced moisture, reduced microbial growth, improved appearance and safety concerns combined with a dispenser that does not come in direct physical contact with the conveyor. Such a system should be useful with a broad variety of lubricant materials that can be spray applied as disclosed below. The lubricant of these methods is preferably made of materials that are H-1 approved and can be contacted with the food or considered to be a food additive and not result in the food being rejected as not fit for human consumption.

SUMMARY OF THE INVENTION

We have surprisingly found that a controlled application of a liquid lubricant (qualified as H-1) in the finely divided form of a stream of divided droplets, particulates, mist or fog of the lubricant can be an effective means for applying lubricant uniformly to a moving conveyor. A size for the finely divided lubricant is selected such that the finely divided material after formation in the lubricating apparatus fall under the influence of gravity directly to the conveyor and substantially all of the lubricant particles contact and remain on the surface such that the conveyor surface interface between a work piece and the conveyor surface is well lubricated. The sprayed particulate forms a coating of the lubricant that can be continuous or discontinuous on the conveyor can be applied continuously in a continuous stream of droplets or not continuously in a the form of a discontinuous stream intermittently applied. The lubricant layer, in the form used to lubricate the interface between the conveyor and the work piece can provide substantial lubrication. We have found that the formation of a particle size of a particular dimension, about 500 to 2500 microns, is important for forming an effective lubricating method. Particles of such a size are not lost in the form of a mist or fog of the lubricant. Such particles readily fall onto, form a layer and remain on the conveyor under the influence of gravity. However, the particles are not of such a large size that the particles cause an overuse or wastage of lubricant. Importantly, the lubricant falls on the conveyor in amounts and in a position that little or no lubricant drips from the conveyor, preferably the lubricant is maintained in a zone on the conveyor leaving a boarder substantially free of lubricant. In the event that an amount of the spray or droplets of the lubricant comes in direct contact with a food or beverage material intended for human use, a lubricant is used that is classified "H1" such that the food containing the lubricant does not become unfit for human consumption.

We have surprisingly found that a relatively low rate of add-on of the droplets of the preferred particle size provides excellent lubrication, the spray droplets of the invention can be produced using a variety of techniques in which the aqueous lubricant is finely divided into droplets of the appropriate size and directed to the conveyor surface. Included in such methods are use of an air stream to shear the liquid into drops of the appropriate size, a spinning disk method that, when contacted with the liquid lubricant, results in a radial spray of the lubricant or other methods of producing the finely divided lubricant droplet spray.

We have further surprisingly found that forming a controlled flow of air and directing a flow of liquid lubricant into the airflow can form droplets of the preferred size and obtain a degree of lubrication adapted to the beverage conveyors. In order to form the correct particle size of the dispersed lubricant, a surprisingly low pressure and relatively low volume per minute flow of air is established and that flow of air is directed into a flow of the lubricant. The lubricant also directed at a relatively slow rate. Preferably, the lubricant is directed into the air stream at an angle substantially normal to the flow of air. The established flow of air, at a pressure of about 0.1 to 20 or about 0.1 to 10 psi and at a low CFM flow rate of about 10 to 25 milliliters of air per second is established through an appropriately sized nozzle. The liquid lubricant is directed into the air stream at a flow rate of about 0.1 to 10 milliliters-sec$^{-1}$ (about 1500 to 4000 mL-hr$^-$1). We have found that the liquid lubricant is sheared by the air flow and produces a particle size in the order of about 100 to 5000 microns, preferably 500 to 2500 microns. The air stream is directed at an angle appropriate to directing the resulting stream of finely divided particulates onto the conveyor system. The add-on angle can be parallel to the conveyor. The air and lubricant flow are controlled such that greater than about 90% of the lubricant is directed onto the conveyor surface at an add on rate of about $5 \times 10^{-4}$ to 0.02 grams-in$^{-1}$ establishing a coefficient of friction between the conveyor and the work piece of less than about 0.14 preferably less than 0.1.

A preferred lubricated conveyor system for transporting a work piece from a first work station to a second work station comprises a moving conveyor belt associated with a mechanism for producing a divided distribution of droplets as described above of liquid lubricant. The lubricating means comprises an air manifold, an air injection means, and a lubricant injection means. The lubricant is directed into the air flow at a rate that produces a droplet of about 100 to 5000 microns and the air flow is controlled such that greater than 90% of the lubricant falls on the container or the conveyor belt. Preferably, the lubricant falls substantially on the conveyor belt under the influence of gravity. The conveyor can be operated to move at a rate that conveys about 200 to 2000 bottles per minute, the interface between the bottles.

Conventional spray equipment typically used in paint application, sanitizing and other applications, typically involves high pressure air stream, high liquid flow rates, designed and engineered to insure that the surface contacted by the spray obtains a high loading in a very short amount of time of the material delivered by the spray. Paint sprayers, for example, deliver high volumes of paint at pressures of about 2000 to 6000 psi in order to provide a paint coating that can be formed quickly and uniformly across a large area of surface. Spray equipment, either in an airless or an air driven spray system are typically engineered so that the spray, in a particular spray pattern, delivers a large amount of material in an efficient transfer to a surface. The development of spray equipment and processes has largely been directed to using high pressure and large volume amounts of spray.

We have also found that the lubricating systems are well adapted to food grade or H-1 lubricants. Any spray that is conveyed onto or into the food in a container must not render the food unfit for human consumption. The use of an H-1 grade lubricant in such a conveyor system can alleviate many concerns with respect to contacting the food material with the lubricant material. Should some amount of the lubricant come into direct, incidental or indirect contact with the food, the presence of the H-1 lubricant in the food does not render the food unsuitable for human consumption. "Food" as used in this application means any substance ingested by humans including liquid, solid, semisolid, composite comestible materials in the form of water, carbonated beverage, a food, juice, sports beverage, snack, edible container or carrier. Such a process an result in substantial savings in the operation of the food manufacturing and packaging operation and can also result in substantial savings of money in general administrative and operating expenses by reducing costs of recall of contaminated materials (in contact with H-2 lubricants) and in reduced administrative costs such as reduced insurance costs. U.S.D.A. H-1 lubricants are regulated in 21 C.F.R. §178 (at 178.3570), 21 C.F.R. §1.72 and 21 C.F.R. §1.82. The materials are formulated to contain ingredients that both lubricate and pass the stringent guidelines of the Federal regulations. For the purposes of this application the terms "Direct, Incidental or Indirect" contact between lubricant and food means that the food acquires an amount of lubricant. This amount if in the form of an H-2 composition would render the food unfit for human consumption. For the purpose of this specification and claims, the term "coating" is intended to mean a continuous or discontinuous thin liquid layer of the lubricant dispersions of the invention on a moving conveyor surface. Applying the liquid to the surface such that the surface of the conveyor is substantially completed covered with the lubricant can form such a coating. Alternatively, the term "coating" can also connote the continuous or the intermittent timed application of the lubricant such that the lubricant can be applied intermittently to a surface of a moving conveyor. The intermittent application of the lubricant can form a continuous layer and still provide an adequate lubricating layer on the surface. The lubricant coatings of the invention can develop areas of the conveyor that do not have any substantial quantity of liquid lubricant as the lubricant interacts with the conveyor surface, the containers and the changing conditions as the conveyor moves through the structure. For the lubricant to work successfully, there must be an amount of lubricant at the container conveyor interface to obtain reduced coefficient of friction. In other words, a successful lubricant coating is present when the lubricant is present at the interface to successfully reduce friction during conveying of a container from place to place on a conveyor.

BRIEF DESCRIPTION OF THE DRAWINGS

FIGS. 3 and 4 are graphical representations of coefficient of friction between a PET bottle and conveyors under various conditions of lubricant add on. In both Figures, the coefficient of friction between the bottle and conveyor is reduced to acceptable operating limits with minimal lubricant add on.

FIG. 5 is an alternate embodiment of apparatus that can develop and apply the appropriately sized finely divided particulates of the lubricant of the invention to an appropriately sized conveyor.

FIG. 6 is a graph of data showing the consistent add-on of lubricant over a period of days at varying add-on amounts and positions on a conveyor.

FIG. 7 is a bar graph representing the advantages obtained using the spray on technology compared to conventional application including a brushed application. The spray on method achieves superior coefficient of friction when compared to conventional techniques.

DETAILED DESCRIPTION OF THE INVENTION

Figure 1:
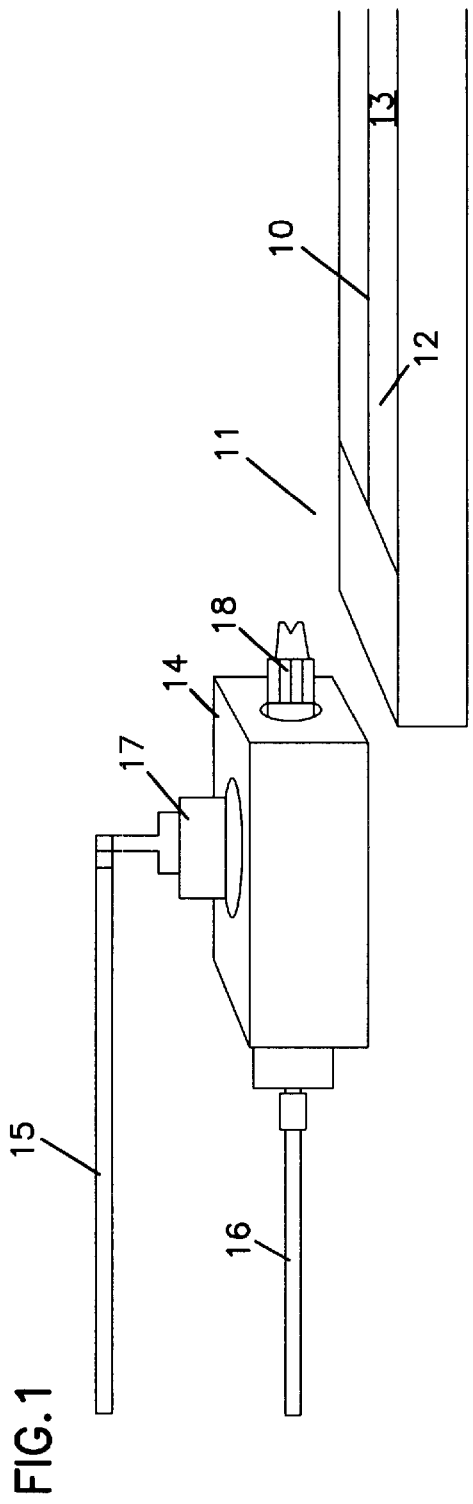
FIGS. 1 and 2 are alternate embodiments of apparatus that can develop and apply the appropriately sized finely divided particulates of the lubricant of the invention to an appropriately sized conveyor.
Figure 2:
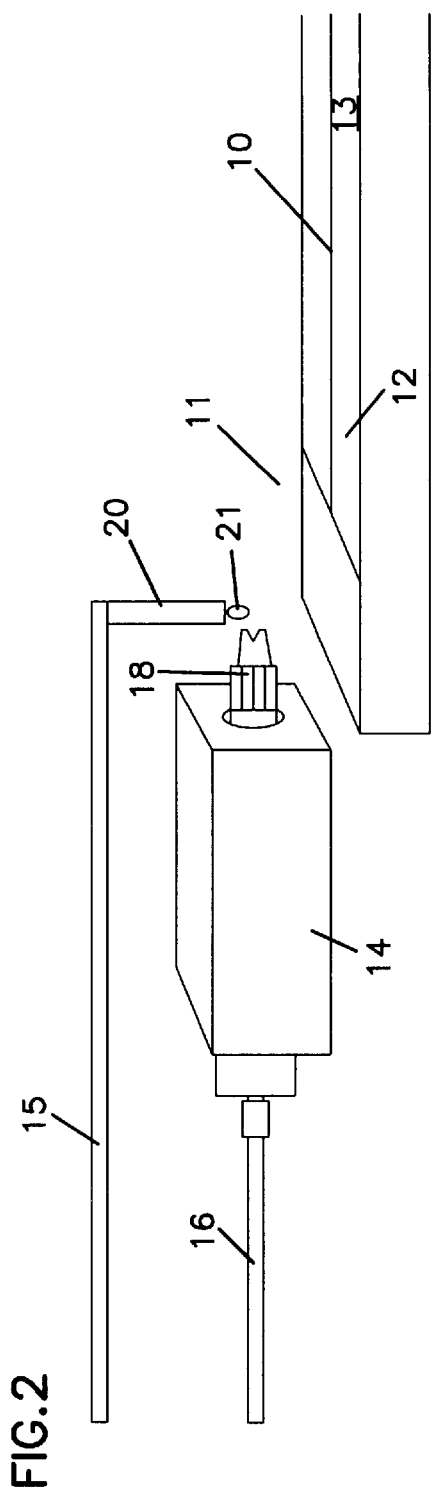

Belt conveyors can be lubricated with a finely divided distribution of liquid droplets. Preferred lubricants are H-1 qualified. The liquid droplets are produced in the interaction of the aqueous lubricant with a source of motive energy. Such sources of energy can include a spinning disk, an air stream directed across the path of a stream of the lubricant or a stream of air that is directed coaxially with the liquid lubricant. In the latter method, a stream of lubricant is passed through a tubular member surrounded by a second tubular member delivering a flow of air surrounding the flow of liquid. Shear between the air and the liquid lubricant breaks the liquid lubricant up into appropriately sized particles. The liquid droplets produced from the interaction between a liquid lubricant and a source of motive energy, such as a moving air stream. The finely divided distribution of droplets is directed to the conveyor surface at an effective loading. The lubricant provides a desirable coefficient of friction with no wastage of lubricant in the conveyor. The preferred lubricant application apparatus comprises air injection with manifold lubrication injection mechanism that provides for the formation of an even distribution of lubricant droplets with a desired particle size. Even if the lubricant is introduced into the food, the food remains suitable for human consumption We have found that the problems inherent in conventional aqueous lubrication of conveyor systems used in food packaging and beverage bottling can be substantially improved using a lubricant layer formed from a particulate lubricant on a conveyor surface. The lubricant layer can be continuous or discontinuous and can be maintained at a thickness of less than about 3 millimeters, preferably about 0.0001 to 2 mm, with an add on of lubricant on the surface of less than about 0.02 gms-in$^{-2}$, preferably about $5 \times 10^{-4}$ to 0.02 gms-in$^{-2}$, most preferably about $2 \times 10^{-4}$ to 0.01 gms-in$^{-2}$. Such a thin lubricating film of the lubricant on the conveyor provides adequate lubrication to the conveyor system but ensures that the lubricant cannot foam, does not flow from the conveyor surface and contacts the absolute minimum surface area of the food container such as the beverage bottle as possible. Such a thin film lubricant maintains significant lubrication while avoiding waste of the lubricant composition and avoiding stress cracking promotion. We have found that one mode of formation of the liquid lubricant compositions of the invention are in the form of an aqueous solution or suspension wherein the aqueous phase comprises about 5 to 95% or 10 to 50 wt % of the lubricant, and the lubricant phase is about 0.01 to 4.8% of the total lubricant composition. The form of an emulsion can be either water in oil or oil in water emulsion. One preferred format of the emulsion is a phase unstable emulsion such that the emulsion separates forming an oil layer on top of a water layer which is then, in turn, contact with the conveyor surface. The methods of the invention can be used to convey virtually any food container on a conveyor line, but is particularly adapted to transporting steel, aluminum cans, cartons, and thermoplastic beverage containers such as polyethylene terephthalate beverage containers. Common PET beverage containers are formed with a petaloid base having a five lobed structure in the base to provide stability to the bottle when it is placed on a surface. The contact with the lubricant on the pentaloid base must be minimized. We have found that using a thin film of lubricant, that less than about 10 to 300 mm$^2$, preferably 20 to 200 mm$^2$ of the surface of the bottle is contacted with lubricant. Certainly, the height of the lubricant in contact with the bottle is less than 3 millimeters. The motion of the conveyor, the tendency of the bottles to rock or move while being conveyed and the other aspects of relative movement at the bottle conveyor interface affect the height of the lubricant on the bottle. The methods of this invention are primarily directed to conveyor operations and do not involve any change in shape of the container arising from forming operations. The desirable coefficient of friction of the conveyor lubricant is about 0.04 to 0.14, preferably about 0.04 to 0.1.

The invention provides a lubricant coating that reduces the coefficient of friction of coated conveyor parts and containers and thereby facilitates movement of containers along a conveyor line. The lubricant compositions used in the invention can optionally contain water or a suitable diluent, as a component or components in the lubricant composition as sold or added just prior to use. The lubricant composition does not require in-line dilution with significant amounts of water, that is, it can be applied undiluted or with relatively modest dilution, e.g., at a water: lubricant ratio of about 0.1:1 to 10:1, about 0.25:1 to 5:1 or about 1:1 to 5:1. In contrast, conventional dilute aqueous lubricants are applied using dilution ratios of about 100:1 to 500:1. The lubricant compositions preferably provide a renewable coating that can be reapplied, if desired, to offset the effects of coating wear. They preferably can be applied while the conveyor is at rest or while it is moving, e.g., at the conveyor's normal operating speed. The lubricant coating preferably is substantially non-dripping, that is, preferably the majority of the lubricant remains on the container or conveyor following application until such time as the lubricant may be deliberately washed away.

The lubricant composition resists loss of lubricating properties in the presence of water or hydrophilic fluids, but can readily be removed from the container or conveyor using conventional aqueous cleaners, without the need for high pressure, mechanical abrasion or the use of aggressive cleaning chemicals. The lubricant composition can provide improved compatibility with plastic conveyor parts and plastic bottles, because the composition does not require inclusion of emulsifiers or other surfactants that can promote stress cracking in plastics such as PET.

A variety of materials can be employed to prepare the lubricated containers and conveyors of the invention, and to carry out the processes of the invention. For example, the lubricant can contain various natural lubricants, petroleum lubricants, synthetic oils and greases. Examples of natural lubricants include vegetable oils, fatty oils, animal fats, and others that are obtained from seeds, plants, fruits, and animal tissue. Examples of petroleum lubricants include mineral oils with various viscosities, petroleum distillates, and petroleum products. Examples of synthetic oils include synthetic hydrocarbons, organic esters, poly(alkylene glycol)s, high molecular weight alcohols, carboxylic acids, phosphate esters, perfluoroalkylpolyethers (PFPE), silicates, silicones such as silicone surfactants, chlorotrifluoroethylene, polyphenyl ethers, polyethylene glycols, oxypolyethylene glycols, copolymers of ethylene and propylene oxide, polyhydroxy compounds and the like. Examples of useful solid lubricants include molybdenum disulfide, boron nitride, graphite, silica particles, silicone gums and particles, polytetrafluoroethylene (PTFE, Teflon), fluoroethylene-propylene copolymers (FEP), perfluoroalkoxy resins (PFA), ethylene-chloro-trifluoroethylene alternating copolymers (ECTFE), poly (vinylidene fluoride) (PVDF), and the like. The lubricant composition can contain an effective amount of a water-based cleaning agent-removable solid lubricant based on the weight of the lubricant composition. The lubricant composition can also contain a solid lubricant as a suspension in a substantially aqueous or non-aqueous liquid. In such a situation, the amount of solid lubricant can be about 0.1 to 50 weight percent, preferably 0.1 to 50 percent, preferably 0.5 to 20 percent by weight, based on the weight of the composition.

Specific examples of useful lubricants include oleic acid, corn oil, mineral oils available from Vulcan Oil and Chemical Products sold under the "Bacchus" trademark; fluorinated oils and fluorinated greases, available under the trademark "Krytox" from is DuPont Chemicals. Also useful are siloxane fluids available from General Electric silicones, such as SF96-5 and SF 1147 and synthetic oils and their mixture with PTFE available under the trademark "Super Lube" from Synco Chemical. Also, high performance PTFE lubricant products from Shamrock, such as nanoFLON M020™, FluoroSLIPT™ 225 and Neptune™ 5031 and polyalkylene glycols from Union Carbide such as UCON™ LB625, and Carbowax™ materials are useful.

A variety of water-miscible silicone materials can be employed in the lubricant compositions, including silicone emulsions (such as emulsions formed from methyl (dimethyl), higher alkyl and aryl silicones; functionalized silicones such as chlorosilanes; amino-, methoxy-, epoxy- and vinyl-substituted siloxanes; and silanols). Suitable silicone emulsions include E2175 high viscosity polydimethylsiloxane (a 60% siloxane emulsion commercially available from Lambent Technologies, Inc.), E2140 FG food grade intermediate viscosity polydimethylsiloxane (a 35% siloxane emulsion commercially available from Lambent Technologies, Inc.), HV490 high molecular weight hydroxy-terminated dimethyl silicone (an anionic 30–60% siloxane emulsion commercially available from Dow Coming Corporation), SM2135 polydimethylsiloxane (a nonionic 50% siloxane emulsion commercially available from GE Silicones) and SM2167 polydimethylsiloxane (a cationic 50% siloxane emulsion commercially available from GE Silicones. Other water-miscible silicone materials include finely divided silicone powders such as the TOSPEARL™ series (commercially available from Toshiba Silicone Co. Ltd.); and silicone surfactants such as SWP30 anionic silicone surfactant, WAXWS-P nonionic silicone surfactant, QUATQ-400M cationic silicone surfactant and 703 specialty silicone surfactant (all commercially available from Lambent Technologies, Inc.). Preferred silicone emulsions typically contain from about 30 wt % % to about 70 wt % water. Non-water-miscible silicone materials (e.g., non-water soluble silicone fluids and non-water-dispersible silicone powders) can also be employed in the lubricant if combined with a suitable emulsifier (e.g., nonionic, anionic or cationic emulsifiers). For applications involving plastic containers (e.g., PET beverage bottles), care should be taken to avoid the use of emulsifiers or other surfactants that promote environmental stress cracking in plastic containers when evaluated using the PET Stress Crack Test set out below. Polydimethylsiloxane emulsions are preferred silicone materials. Preferably the lubricant composition is substantially free of surfactants aside from those that may be required to emulsify the silicone compound sufficiently to form the silicone emulsion.

Preferred amounts for the silicone material, hydrophilic lubricant and optional water or hydrophilic diluent are about 0.05 to about 12 wt %, preferably about 0.05 to less than 5 wt %, of the silicone material (exclusive of any water or other hydrophilic diluent that may be present if the silicone material is, for example, a silicone emulsion), about 0 to about 99.95 wt % of the hydrophilic lubricant, and 0 to about 99.95 wt % of water or hydrophilic diluent. More preferably, the lubricant composition contains about 0.5 to about 4.5 wt % of the silicone material, about 10 to about 98 wt %, preferably about 15 to about 95 wt % of the hydrophilic component lubricant, and about 2 to about 84.5 wt % of water or hydrophilic diluent. Most preferably, the lubricant composition contains about 0.8 to about 4.5 wt % of the silicone material, about 50 to about 85 wt % of the hydrophilic lubricant, and about 11 to about 49.2 wt % of water or hydrophilic diluent for a total of greater than 95% of hydrophilic materials.

The silicone lubricants can be water soluble but are preferably water-dispersible in a cleaning mode. In such cases, the lubricant can be easily removed from the surface, if desired, by, for example, a rinse or other treatment with water. The lubricant, whether water soluble or dispersible or not, is preferably easily removable from the container, conveyor and/or other surfaces in the vicinity, with common or modified detergents, for example, including one or more of surfactants, an alkalinity source, and water-conditioning agents. Useful water soluble or dispersible lubricants include, but are not limited to, polyhydroxy compounds, polymers of one or more of ethylene oxide, propylene oxide, methoxy polyethylene glycol, or an oxyethylene alcohol. Preferably the lubricant is compatible with the beverage intended to be filled into the container. If water is employed in the lubricant compositions, preferably it is deionized water. Other suitable hydrophilic diluents include alcohols such as isopropyl alcohol.

The lubricant coating should be sufficiently thick to provide the desired degree of lubrication, and sufficiently thin to permit economical operation and to discourage drip formation. The lubricant coating thickness preferably is maintained at at least about 0.0001 mm, more preferably about 0.001 to about 2 mm, and most preferably about 0.005 to about 0.5 mm. The lubricant is maintained on the conveyor, free of dripping from the surface. A boarder of greater than about 1 mm preferably more than 1 cm or more is formed between the edge of the lubricant and the edge of the conveyor to maintain the lubricant on the conveyor.

The lubricant compositions preferably have a coefficient of friction (COF) that is less than about 0.14, more preferably less than about 0.1, when evaluated using the Short Track Conveyor Test, as follows: coefficient of friction (COF) measured on a short track conveyor system: The determination of lubricity of the lubricant was measured on a short track conveyor system. The conveyor was equipped with two belts from Rexnord. The belt was Rexnord LF (polyacetal) thermoplastic belt of 3.25" width and 20 ft long. The lubricant was applied to the conveyor surface evenly. The conveyor system was run at a speed of 100 ft/min. Six 2L bottles filled with beverage were stacked in a rack on the track with a total weight of 16.15 kg. The rack was connected to a strain gauge by a wire. As the belts moved, force was exerted on the strain gauge by the pulling action of the rack on the wire. A computer recorded the pull strength. The coefficient of friction (COF) was calculated on the basis of the measured force and the mass of the bottles and it was averaged from the beginning to the end of the run.

Short Track Conveyor Test

A conveyor system employing a motor-driven 83 mm wide by 6.1-meter long REXNORD™ LF polyacetal thermoplastic conveyor belt is operated at a belt speed of 30.48 meters/minute. Six 2-liter filled PET beverage bottles are stacked in an open-bottomed rack and allowed to rest on the moving belt. The total weight of the rack and bottles is 16.15 Kg. The rack is held in position on the belt by a wire affixed to a stationary strain gauge. The force exerted on the strain gauge during belt operation is recorded using a computer. A thin, even coat of the lubricant composition is applied to the surface of the belt using an applicator made from a conventional bottle wash brush. The belt is allowed to run for 5–60 minutes during which time a consistently low COF is observed. The COF is calculated on the basis of the measured force and the mass of the bottles, averaged over the run duration. Next, 60 ml of warm water is sprayed over a 30 second period onto the conveyor surface, just upstream from the rack (under the wire). Application of the lubricant is continued for another 5 minutes, and the average COF is noted.

The containers of the invention can be made from virtually any thermoplastic that can have any degree of stress cracking in the plastic when filled with a beverage or under pressure from beverage contents. Such thermoplastic materials can include polyethylene, polypropylene, polycarbonate, polyvinylchloride, polystyrene and other such polymerized materials. The polymers of greatest interest include polyethylene terephthalate, polyethylene naphthalate, polycarbonate and other similar polymers. Copolymers of interest include copolymers and ethylene and dibasic acids such as terephthalic acid, naphthenic acid and others. Further, containers made of polymer alloys or blends such as blended PET and PEN, blended PVC and polyacrylates along with other alloys and blends can be useful. Further, containers comprising two or more laminated polymer layers can be useful. Any of the thermoplastic materials mentioned above can be used in each of the layers of the bottle. One useful material that can avoid stress cracking while maintaining high concentrations of carbonation in a carbonated beverage can include a PET/PVOH laminate, a PEN/PVOH laminate, a polycarbonate/PET laminate, a polystyrene/PET laminate and others. Further, additional layers can be introduced for the purpose of achieving additional properties in the container structure. For example, a layer can be added to the laminate that protects the beverage contained within the bottle from reaching residual monomer from the polyester, the PVC or other plastic. A laminate layer can be introduced to the exterior of the bottle for the formation of a printable surface. In such a way a useful bottle material can be made using a variety of materials in a variety of structures including single component bottles, polymer alloys and blends and laminates of various size and composition.

Containers include beverage containers; food containers; household or commercial cleaning product containers; and containers for oils, antifreeze or other industrial fluids. The containers can be made of a wide variety of materials including glasses; plastics (e.g., polyolefins such as polyethylene and polypropylene; polystyrenes; polyesters such as PET and polyethylene naphthalate (PEN); polyamides, polycarbonates; and mixtures or copolymers thereof); metals (e.g., aluminum, tin or steel); papers (e.g., untreated, treated, waxed or other coated papers); ceramics; and laminates or composites of two or more of these materials (e.g., laminates of PET, PEN or mixtures thereof with another plastic material). The containers can have a variety of sizes and forms, including cartons (e.g., waxed cartons or TETRAPACK™ boxes), cans, bottles and the like. Although any desired portion of the container can be coated with the lubricant composition, the lubricant composition preferably is applied only to parts of the container that will come into contact with the conveyor or with other containers. Preferably, the lubricant composition is not applied to portions of thermoplastic containers that are prone to stress cracking. In a preferred embodiment of the invention, the lubricant composition is applied to the crystalline foot portion of a blow-molded, footed PET container (or to one or more portions of a conveyor that will contact such foot portion) without applying significant quantities of lubricant composition to the amorphous center base portion of the container. Also, the lubricant composition preferably is not applied to portions of a container that might later be gripped by a user holding the container, or, if so applied, is preferably removed from such portion prior to shipment and sale of the container. For some such applications the lubricant composition preferably is applied to the conveyor rather than to the container, in order to limit the extent to which the container might later become slippery in actual use. These polymer materials can be used for making virtually any container that can be thermoformed, blow molded or shaped in conventional thermoplastic shaping operations. Included in the description of containers of the invention are containers for carbonated beverages such as colas, fruit flavored drinks, root beers, ginger ales, carbonated water, etc. Also included are containers for malt beverages such as beers, ales, porters, stouts, etc. Additionally, containers for dairy products such as whole, 2% or skim milk are included along with containers for juices, Koolaid® (and other reconstituted drinks), tea, Gatoraid® or other sport drinks, neutraceutical drinks and still (non-carbonated) water. Further, food containers for flowable but viscous or non-Newtonian foods such as catsup, mustard, mayonnaise, applesauce, yogurt, syrups, honey, etc. are within the scope of the invention. The containers of the invention can be virtually any size including (e.g.) five gallon water bottles, one gallon milk chugs or containers, two liter carbonated beverage containers, twenty ounce water bottles, pint or one half pint yogurt containers and others. Such beverage containers can be of various designs. Designs can be entirely utilitarian with a shape useful simply for filling transportation, sales and delivery. Alternatively, the beverage containers can be shaped arbitrarily with designs adapted for marketing of the beverage including the classic "coke" shape, any other decorative, trademarked, distinctive, or other design can be incorporated into the bottle exterior. A first aspect of the invention comprises a lubricant formulated using an aqueous carrier using concentrations of materials that are designed or adapted for direct application to the conveyor container contact surface without further dilution with an aqueous stream. A second aspect of the invention comprises a lubricant comprising an aqueous carrier and a concentration of active materials that are designed or adapted for dilution with water to form a dilute lubricant material. In this aspect, the lubricants are typically formulated for dilution with from about 100 to about 500 parts of aqueous diluent per each 1 part of the formulated lubricant material. A further aspect of the invention comprises a lubricant having a formulation dispersed in an oleophilic carrier which can be applied directly to the interface between a container and a conveyor surface for lubricating purposes. Such a lubricant oleophilic formulation can be applied neat (without dilution). Still another aspect of the invention comprises a lubricant comprising an oleophilic carrier in a concentration of active materials that are designed and adapted for dilution with a diluent which can comprise an oleophilic liquid or a hydrophilic liquid such as water for application purposes.

In another aspect of the invention, the methods of the invention can be used to convey a number of different types of containers or packages. Such containers include cans, bottles or cartons and boxes. Cans typically include both steel and aluminum cans that are typically conveyed with an open top filled with a food product such as stew, soup, beverage or other dried, aqueous or composite food product. Bottles include glass or thermoplastic bottles including polyethylene terephthalate, polycarbonate, polyethylene, polypropylene or other common resin materials. Lastly, cartons or boxes can include materials made from cellulosic webs that can be used in a corrugated form, a sheet-like form, or a coated material in which the coatings comprises a wax, a resin or other printed or non-printed materials.

The lubricants of the invention can be formulated in a liquid solution form. Alternatively, the lubricants can be made by dispersing an oleophilic phase in an aqueous or hydrophilic phase. Alternatively, the lubricants can be formulated by dispersing an aqueous or hydrophilic phase in an oleophilic phase. Commonly, the diluents or continuous phase materials of the invention include either an aqueous phase which can comprise suitable potable water or a solution of H-1 materials in such potable water diluents. The oleophilic diluents can comprise typically available edible oils. The lubricants of the invention can take the form of a single phase of the formulation. Such single phase can comprise a solution of oleophilic materials in an oleophilic medium or can comprise aqueous soluble components in an aqueous medium.

The aqueous or oleophilic diluents contemplated above can be combined with a variety of lubricant materials. Lubricant materials can be used as is or in combination with a variety of other functional additives for their known uses. The following nonexclusive list provides direction for selecting H-1 ingredients. This list of ingredients should be read in concert with 21 C.F.R. §§1.172, 1.178 and 1.182 which are expressly incorporated by reference herein for a description of foodgrade or H-1 qualified materials and their uses.

Antioxidants

Anoxomer; L-Ascorbic acid; Ascorbyl palmitate; Ascorbyl stearate; K-Butyl hydroquinone; Calcium ascorbate; Calcium lactate; Calcium phosphate (dibasic); Clove and Coffee bean extract; Disodium citrate; distearyl thiodipropionate; Dodecyl galleate; Edetic acid; Erythorbic acid; Ethoxy-1,2-dihydro-2,2,4-trimethylquinoline; Eucalyptus oil; Fumaric acid; Gallic acid; Gentian extract; Gualec gum; n-Heptyl p-hydroxybenzoate; Heptyl paraben; Hesperetin; 4-Hydroxymethyl-2,6-dl-t-butanol; Isopropyl citrate; Lecithin; Nordihydrogueretic acid; Octyl gallate; Oryzanol; Phosphatidyicholine; Phosphoric acid; Pimento extract; Potassium citrate; Potassium metabisulfite; Potassium phosphate; Potassium sulfite; Propylene glycol; Rapeseed oil; Rice bran extract; Sage extract; Sodium ascorbete; Sodium carbonate; Sodium citrate; Sodium erythorbate; Sodium hypophosphite; Sodium metabisulfite; Sodium sulfite; Sodium tartrate; sodium thiosulfate (anhyd); Sodium thiosulfate pentahydrate; Stannous chloride (anhyd); Stannous chloride (dihydrate); Sucrose; L-Tartaric acid; d-a-Tocopheral; dl-a-Tocophenol; 2,4,5-Trihydroxybutyrophenol.

Binders

Albumin macro aggregates; Aluminum caprylate; Aluminum stearate; Arabinogalactan Calcium stearate; Caprylic/ capric acid; Carboxymethylcellulose sodium; Carboxymethyl cellulose; Carrageenan; Cellulose; Dextrin; Food starch modified; Gluconolactone; Hydrogenated stearic acid; Hydrogenated vegetable oil; Magnesium stearate; Methoxyethanol; Methylcellulose; Microcrystalline cellulose; Mineral oil; Nonoynol-7; Oleic acid; Pea protein concentrate; various liquid and thickened solid polyethylene glycol compositions PEG-4; PEG-6; PEG-8; PEG-9; PEG-12; PEG-14; PEG-16; PEG-24; PEG-32; PEG-40; PEG-75; PEG-100; PEG-150; PEG-200; Polyethylene glycol; Potassium oleate; Potassium polymetaphosphate; Potassium stearate; Potassium tripolyphosphate; Rennet Sodium cassinate; Sodium hexametaphosphate; Sodium laurate; Sodium metaphosposphate; Sodium myristate; Sodium oleate; Sodium palmitate; Sodium stearate; Soy acid; Soy protein; Tallow acid; Trimyriatin; Whey, dry; Whey protein conc; Whey, reduced lactose; Whey, reduced minerals; Zanthan gum.

Bleaching Agents or Decolorizing Agents

Acetone peroxide Ammonium persulfate; Azodicarbonamide; Benzoyl peroxide Carbon, activated; Catalase; Chloromethylated aminated styrene divinylbenzene resin ammonium chloride; $H_2O_2 \cdot BrO_3$; Lipoxidase; Sodium hydrosulfite; Sodium hypochlorite; Sodium metabisulfite; Sodium sulfite; Sulfur dioxide.

Emulsifiers

Acacia; Acetylated hydrogenated coconut glycerides; Acetylated hydrogenated cottonseed glyceride; Acetylated hydrogenated soybean oil glyceride; Acetylated lard glyceride; Acetylated mono- and diglycerides of fatty acids; Acetylated tartaric acid esters of mono- and diglycerides of fatty acids; Acyl lactylates; Agar; Albumen; Algin; Alginic acid; Aluminum caprylate; Aluminum stearate; Ammonium alginate; Ammonium carrageenan; Ammonium furcelleran; Ammonium phosphate, dibasic; Arabinogalactan; Ascorbyl palmitate; Bakers yeast extract; Bentonite Calcium carrageenan; Calcium citrate; Calcium dihydrogen pyrophosphate; Calcium furcelleran; Calcium lactate; Calcium phosphate monobasic monohydrate; Calcium phosphate tribasic; Calcium/sodium stearoyl lactylate; Calcium stearate; Calcium stearoyl lactylate; Canola oil glyceride; Capric triglyceride; Caprylic/capric triglyceride; Capryllic triglyceride; Carrageenan; Cellulose; Cholesterol; Cholic acid; Coconut oil; Corn glycerides; Corn oil; Cottonseed glyceride; Cottonseed oil; Damer; Diacetyl tartaric acid esters of mono- and diglycerides; Disodium citrate; Disodium phosphate, dihydrate; Disodium pyrophosphate; Furcelleran; Glyceryl caprate; Glyceryl caprylate/caprate; Glyceryl citrate/lactate/ linoleate/oleate; Glyceryl cocoate; Glyceryl cottonseed oil; Glyceryl dioleate; Glyceryl dioleste SE; Glyceryl disterate; Glyceryl distearate SE; Glyceryl d/tribehenate; Glyceryl lactoesters; Glyceryl lactoeleate; Glyceryl lactopalmitate/ stearate; Glyceryl laurate; Glyceryl laurate SE; Glyceryl linoleate; Glyceryl mono/dilaurate; Glyceryl mono/dioleate; Glyceryl mono/distearate; Glyceryl mono/distearate-palmitate; Glyceryl oleate; Glyceryl oleate SE; Glyceryl palmitate; Glyceryl palmitate lactate; Glyceryl palmitate stearate; Glyceryl ricinoleate; Glyceryl ricinoleate SE; Glyceryl soyate; Glyceryl stearate; Glyceryl stearate citrate; Glyceryl state lactate; Glyceryl stearate SE; Guar gum Gum ghelti; Hydrogenated cottonseed glyceride; Hydrogenated lard glyceride; Hydrogenated lard glycerides; Hydrogenated palm glyceride; Hydrogenated rapeseed oil; Hydrogenated soybean glycerides; Hydrogenated soy glyceride; Hydrogenated tallow glyceride; Hydrogenated tallow glyceride citrate; Hydrogenated tallow glyceride lactate; Hydrogenated tallow glycerides; Hydrogenated vegetable glyceride; Hydrogenated vegetable glycerides; Hydrogenated vegetable oil. Hydroxylated lecithin; Hydroxypropylcellulose; Hydroxypropyl methylcellulose; Karaya gum; Lactic acid esters of mono-and diglycerides of fatty acids; Lactylic esters of fatty acids; Lard; Lard glyceride; Lard glycerides; Lecithin; Locust bean gum; Magnesium stearate; Methylcellulose; Methyl ethyl cellulose; Mono- and diglycerides of fatty acids; Mono- and diglycerides, sodium phosphate derives; Octenyl succinic anhydride; Oleth-23; Palm glyceride; Palm oil; Palm oil sucroglyceride; Peanut glycerides; Peanut oil; Pea protein concentrate; Pectin; PEG-20 dilaurate; PEG-7 glyceryl cocoate; PEG-20 glyceryl stearate; PEG-40 sorbitan hexataliate; PEG-20 sorbitan tritaliate; PEG-6 stearate; PEG-8 stearate; PEG-40 stearate; Pentapotassium triphosphate; Phosphatidylcholine; Polyglyceryl-10 decasterate; Polyglyceryl-10 decastearate; Polyglyceryl-2 dilsostearate; Polyglyceryl-3 dilsostearate; Polyglyceryl-5 dilsostearate; Polyglyceryl-3 dioleate; Polyglyceryl-6 dioleate; Polyglyceryl-10 dioleate; Polyglyceryl-10 dipalmitate; Polyglyceryl-2 distearate; Polyglyceryl-3 distearate; Polyglyceryl-5 distearate; Polyglyceryl-6 distearate; Polyglyceryl-10 distearate; Polyglyceryl-8 hexaoleate; Polyglyceryl-10 hexaoleate; Polyglyceryl-10 isostearate; Polyglycaryl-10 laurate; Polyglyceryl-10 linoleate; Polyglyceryl-10 myristate; Polyglyceryl-2 oleate; Polyglyceryl-3 oleate; Polyglyceryl-4 oleate; Polyglyceryl-6 oleate; Polyglyceryl-8 oleate; Polyglyceryl-4 pentaoleate; Polyglyceryl-10 pentaoleate; Polyglyceryl-4 pentastearate; Polyglyceryl polyyricinoleate; Polyglyceryl-2 sesquioleate; Polyglyceryl-2 stearate; Polyglyceryl-3 stearate; Polyglyceryl-4 stearate; Polyglyceryl-8 stearate; Polyglyceryl-10 stearate; Polyglyceryl-10 tetraoleate; Polyglyceryl-2 tetrastearate; Polyglyceryl-2 trisosterate; Polyglyceryl-4 tristearate; Polysorbate 20; Polysorbate 21, Potassium alginate; Potassium citrate; Potassium furcelleran; Potassium oleate; Potassium phosphate dibasic; Potassium phosphate tribasic; Potassium polymetaphosphate; Potassium sodium tartrate anhyd; Potassium sodium tartrate tetrahydrate; Potassium tripolyphosphate; Propylane glycol; Propylene glycol alginate; Propylene glycol dicaprylate/dicaprate; Propylene glycol esters of fatty acids; Propylene glycol laurate; Propylene glycol laurate SE; Propylane glycol monodistearate; Propylene glycol oleate; Propylene glycol oleate SE; Propylene glycol palmitate; Propylene glycol ricinoleate; Propylene glycol ricinoleate SE; Propylene glycol ricinoleate SE; Propylene glycol stearate; Propylene glycol stearate SE; Rapeseed oil glyceride; Saccharose distearate; Saccharose mono/distearate; Saccharose palmitate; Safflower glyceride; Safflower oil; Sodium acid pyrophosphate; Sodium aluminum phosphate acid; Sodium aluminum phosphate, basic; Sodium carrageenan; Sodium caseinate; Sodium furcellaran; Sodium hexametaphosphate; Sodium hypophosphite; Sodium laurate; Sodium lauryl sulfate; Sodium metaphosphate; Sodium phosphate dibasic; Sodium phosphate tribasic; Sodium phosphate tribasic dodecahydrate; Sodium stearate; Sodium stearoyl lactylate; Sodium tartrate; Sorbitan caprylate; Sorbitan myristate; Sorbitan palmitate; Sorbitan sesquioleate; Sorbitan sesquistearate; Sorbitan stearate; Sorbitan trioleate; Sorbitan tristearate; Sorbitan tritallate; Soybean oil; Soy protein; Steareth-20; Stearyl-2-lactyle acid; Succinylated monoglycerides; Succistearin; Sucrose dilaurata; Sucrose distearate; Sucrose erucate; Sucrose fatty acid esters; Sucrose laurate; Sucrose myristate; Sucrose oleate; Sucrose palmitate; Sucrose polylaurate; Sucrose polylinoleate; Sucrose polyoleate; Sucrose polystearate; Sucrose stearate; Sucrose tetrastearate triacetate; Sucrose tribehenete; Sucrose tristerate; Sunflower seed oil; Sunflower seed oil glyceride; Sunflower seed oil glycerides; Superglycerinated hydrogenated rapeseed oil; Tallow glyceride; Tallow glycerides; Tartaric acid esters of mono- and diglycerides, Tetrapotassium pyrophosphate; Tetrasodium pyrophosphate; Tragacanth gum; Triaodium citrate; Xanthan gum.

Lipid/Grease

Acetylated hydrogenated coconut glycerides; Acetylated hydrogenated soybean oil glyceride; Acetylated mono- and diglycerides of fatty acids; Beeswax; C8-10 fatty acid triglyceride; Calcium carbonate; Calcium silicate; Calcium stearate; Candle wax; Capric acid; Caprylic acid; Caprylic/capric acid; Carnauba; Castor oil; Coconut oil; Cottonseed oil; Dimethicone; Ethylene distearamide; Glyceryl dioleate; Glyceryl dioleate SE; Glyceryl distearate; Glyceryl distearate; SE: Glyceryl laurate SE; Glyceryl oleate SE; Glyceryl ricinoleate; SE; Glyceryl stearate; Glyceryl tricaprylate/caprate; Glyceryl trienanthate; Hydrogenated sperm oil; Hydrogenated stearic acid; Hydrogenated vegetable glycerides phosphate; Hydrogenated vegetable oil; Lecithin; Linoleamide; Magnesium carbonate hydroxide; Magnesium oxide; Magnesium silicate; Magnesium stearate; D-Mannitol; Microcrystalline cellulose; Microcrystalline wax; Mineral oil; Mono- and diglycerides of fatty acids; Mono- and diglycerides; sodium phosphate derivatives; Oleamide; Oleyl alcohol; Oxystearin; Palmitamide; Palmitic acid; Palm oil; PEG-4; PEG-8; PEG-9; PEG-12; PEG-14; PEG-16; PEG-20; PEG-32; PEG-40; PEG-75; PEG-100; PEG-150; PEG-200; PEG-6 oleate; PEG-8 oleate; Petrolatum; Polyethylene glycol; Rice bran wax; Sodium glyceryl oleate phosphate; Soy acid; Soybean oil; Stearamide; Stearic acid; Sucrose dilaurate; Sucrose distearate; Sucrose laurate; Sucrose myristate; Sucrose polylaurate; Sucrose polylinoleate; Sucrose polyoleate; Sucrose stearate; Sucrose tetrastearate triecetate; Sucrose tribahanate; Talc; Trimyristin; Tristearin.

Oxidizing Agents or Reducing Agents $NaO_4$; Benzoyl peroxide; Calcium peroxide; Catalase; L-Cystaine; $ClO_2$; $H_2O_2$; KOH Sodium thiosulfate anhyd; Sodium thiosulfate pentahydrate; Stannous chloride anhyd.

Buffers, pH Modifiers

Ammonia diphosphate; Ammonium alum; Ammonium bicarbonate; Ammonium carbonate; Ammonium isovalerate; Ammonium phosphate; Ammonium phosphate, dibasic; Calcium acetate; Calcium chloride; Calcium citrate; Calcium gluconate; Calcium hydroxide; Calcium lactate; Calcium phosphate monobasic monohydrate; Calcium pyrophosphate; Calcium sulfate; Carbon dioxide; Citric acid; Cyclamic acid; Disodium citrate; Disodium phosphate; dihydrate; Disodium succinate; Fumaric acid; D-Gluconic acid; Gluconolactone; Glycine; Hydrochloric acid; N-Hydroxysuccinic acid; a-Ketoglutaric acid; Lactic acid; Magnesium carbonate; Magnesium carbonate hydroxide; Magnesium hydroxide; Magnesium oxide; Magnesium phosphate; dibasic; Magnesium phosphate; tribasic Pentapotassium triphosphate; Potassium acetate; Potassium alum dodecahydrate; Potassium bicarbonate; Potassium carbonate; Potassium chloride; Potassium citrate; KOH; Potassium lactate; Potassium phosphate; Potassium phosphate dibasic; Potassium phosphate tribasic; Potassium polymetaphosphate; Potassium sodium tartrate anhyd; Potassium sodium tartrate tetrahydrate; Sodium acetate trihydrate; Sodium acid pyrophosphate; Sodium alum; Sodium aluminum phosphate acidic; Sodium bicarbonate; Sodium bisulfate; Sodium bisulfate solid; Sodium carbonate; Sodium citrate; Sodium diacetate; Sodium fumerate; Sodium lactate; Sodium metaphosphate; Sodium phosphate; Sodium phosphate dibasic; Sodium phosphate tribasic; Sodium phosphate tribasic dodecahydrate; Sodium sesquicarbonate; Sodium succinate; Sodium tartrate; Succinic acid; Succinic anhydride; Sulfuric acid; Tannic acid; L-Tartaric acid; Tetrapotassium pyrophosphate; Trisodium citrate.

Thickeners

Agar; Alcohol; Ammonium persulfate; Anoxomer; L-Ascorbic acid; Ascorbyl palmitate Benzylparaben; Butylparaben; Calcium acetate; Calcium ascorbate; Calcium banzoate; Calcium bromide; Calcium chloride; Calcium citrate; Calcium disodium EDTA; Calcium formate; Calcium propionate; Calcium sorbate; Caprylic acid; Carbon dioxide; Catalese; Cetalkonium chloride; Chlorine; Corlander oil; Dehydroacetic acid; 2,2-Dibromo-3-nitrilopropionamide; Diethyl fumarate; Dilauryl thlodipropionate; Dimethyl dicarbonate; Dimethyl fumarate; Disodium cyanodithiomidocarbonate; Distearyl citrate Erythorbic acid; 8-Ethoxy-1,2-dihydro-2,2,4-trimethylquinoline; Ethylenediaminie; Ethyl fumarate; Ethyl paraben; Glucose oxidase; Gluteral; Glyceryl cottonseed oil n-Heptyl p-hydroxybenzoate; Heptyl paraben; Hexamethylene tetramine; Hydrogen peroxide; 4-Hydroxymethyl-2,6-di-t-butylphenol; Imazall; Isobutyl p-hydroxybenzoate; Isopropyl p-hydroxybenzoate; Lauralkonium chloride; Methyl fumarate; Myristalkonium chloride; Nabam; Natarmycin; Nisin; Potassium acid tartrate; Potassium benzoate; Potassium bleufite; Potassium butyl paraben; Potassium ethylparaben; Potassium metabisulfite; Potassium N-methyldithiocarbonate; Potassium nitrate; Potassium nitrite; Potassium propylparaben; Potassium sorbate; Potassium sulfite; Potassium trichlorophenate; Propylparaben; Relinol; Retinyl acetate; Salicylic acid; Sodium acid pyrophosphate; Sodium ascorbate; Sodium benzoate; Sodium bisulfate solid; Sodium bisulfite; Sodium butylparaben; Sodium chloride; Sodium dehydroacetate; Sodium diacetate; Sodium dimethyldithiocarbanate; Sodium formate; Sodium hypophosphite; Sodium metabisulfite; Sodium methylparaben; Sodium nitrate; Sodium nitrite; Sodium pentachlorophenate; Sodium propylparaben; Sodium sorbate; Sodium sulfite; Sorbic acid; Stannous chloride anhyd; Stearalkonium chloride; Stearyl citrate; Sucrose; Sucrose erucate; Sulfur dioxide; n-Tetradecyl dimethyl ethybenzyl ammonium chloride; Thiabendazole; d-a-Tocopherol; Tragecanth gum; 2,4,5-Trihydroxybutyrophenone; Tristearyl citrate; Zinc chloride.

Processing Aids

Acacia; Acetone; Acrylates/acrylamide copolymer; Agar; Albumen; Alcohol; Algin; Alginic acid; Ammonia; Ammonium alum; Ammonium chloride; Ammonium hydroxide; Ammonium phosphate, dibasic; Bentonite; Bromelain; Calcium acetate; Calcium chloride; Calcium glutonate; Calcium hydroxide; Calcium silicate; Calcium/sodium stearoyl lactylate; Calcium sulfate; Candida guillermonda; Candida lipolytica; Caramel; Carbohydraes; Carbohydrase-cellilase; Carbohydrase from *Aspergillus niger;* Carbohydrase from *Rhizopus oryzea;* Carbon, activated; Carbon balck; Carbon dioxide; Carnauba; Casein; Catalase; Cellulase; Cellulose; Chlorine; Chloromethylated aminated styrenedivinylbanzene resin; Cobalt; Cocamide DEA; Cocoa butter substitute; Coconut oil; Copper; Corn oil; Cottonseed flour, partially defatted, cooked; Cottonseed oil; Cupric sulfate (anhydrous); Cupric sulfate (pentahydrate); cyclodextrin; Dextrin; Dialkyl dimethyl ammonium chloride; Distomaceious earth; Diethylaminoethyl cellulose; Dimethylamine/epichlorohydrin copolymer; Dioctyl sodium sulfosuccinate.

Sequestrants

Ascorbyl palmitate; Calcium acetate; Calcium chloride; Calcium citrate; Calcium diacetate; Calcium disodium EDTA; Calcium gluconate; Calcium hexametaphosphate; Calcium phosphate monobasic monohydrate; Calcium phylate; Citric acid; Disodium citrate; Disodium pyrophosphate; Distearyl citrate; Gluconolactone; Isopropyl citrate; Oxystearin; Pentapotassium triphosphate; Pentasodium triphosphate; Potassium citrate; Potassium D-gluconate; Potassium phosphate; Potassium phosphate tribasic; Potassium sodium tartrate anhyd; Potassium sodium tartrate tetrahydrate; Sodium acid phosphate; Sodium acid pyrophosphate; Sodium carbonate; Sodium diacetate; Sodium hexametaphosphate; Sodium metaphosphate; Sodium phosphate; Sodium phosphate dibasic; Sodium phosphate tribasic; Sodium tartrate; Sodium thiosulfate anhyd; Sodium thiosulfate pentahydrate; Starch; Succinic acid; Tetrapotassium pyrophosphate; Tetrasodium pyrophosphate; Triethyl citrate; Tristearyl citrate.

Solubilizers

Citric acid esters of mono- and diglycerides of fatty acids; Glyceryl caprylate; Glyceryl caprylate/caprate; Isocetyl alcohol; Monoglyceride citrate; Nonoxynol-16-14 PEG-6 dilaurate; PEG-20 dilaurate; PEG-32 dilaurate; PEG-75 dilaurate; PEG-150 dilaurate; PEG-6 dioleate; PEG-20 dioleate; PEG-32 dioleate; PEG-75 dioleate; PEG-150 dioleate; PEG-6 distearate; PEG-20 distearate; PEG-32 distearate; PEG-75 distearate; PEG-20 glyceryl isostearate; PEG-30 glyceryl isostearate; PEG-20 glyceryl laurate; PEG-30 glyceryl laurate; PEG-20 glyceryl oleate; PEG-30 glyceryl oleate; PEG-15 glyceryl ricinoleate; PEG-30 glyceryl stearate; PEG-25 glyceryl trioleate; PEG-50 hydrogenated castor oil; PEG-60 hydrogenated castor oil; PEG-32 laurate; PEG-8 oleate; PEG-32 oleate; PEG-40 sorbitan dilisostearate; PEG-80 sorbitan laurate; PEG-20 sorbitan tritaltate; PEG-32 stearate; PEG-75 stearate; Poloxamer 105; Poloxamer 108; Poloxamer 123; Poloxamer 124; Poloxamer 181; Poloxamer 182; Poloxamer 184; Poloxamer 185; Poloxamer 188; Poloxamer 212; Poloxamer 215; Poloxamer 217; Poloxamer 231; Poloxamer 234; Poloxamer 235; Poloxamer 237; Poloxamer 238; Poloxamer 282; Poloxamer 284; Poloxamer 288; Poloxamer 331; Poloxamer 333; Poloxamer 334; Poloxamer 335; Poloxamer 338; Poloxamer 401; Poloamer 402; Poloxamer 403; Poloxamer 407; Polyglyceryl-10 hexaoleate; Polysorbate 40; Polysorbate 61; Polysorbate 80; Polysorbate 81; Polysorbate 85; Sorbitan laurate; Sucrose distearate; Sucrose stearate; Triolein.

Surfactant

Algin; Alumina; Ammoniated glycyrrhizin; Ammonium caseinate; Calcium lignosulfonate; Calcium silicate; Calcium/sodium stearoyl lactylate; Carboxymethyl methylcellulose; Cellulose; Citric acid; Cobalt sulfate (ous); Glyceryl caprylate; Glyceryl cottonseed oil; Glyceryl dioleate; Glyceryl dioleate SE; Glyceryl distearate; Glyceryl distearate SE; Glyceryl isostearate; Glyceryl laurate; Glyceryl laurate SE; Glyceryl oleate; Glyceryl oleate SE; Glyceryl ricinoleate; Glyceryl ricinoleate SE; Glyceryl stearate SE; Guar gum; Hydrogenated lard glyceride; Hydrogenated lard glycerides; Hydrogenated palm glyceride; Hydrogenated soybean glycerides; Hydrogenated soy glyceride; Hydrogenated tallow glyceride; Hydrogenated tallow glycerides; Hydrogenated vegetable glycerides; Hydroxypropylcellulose; Hydroxypropyl methylcellulose; Lactylated fatty acid esters of glycerol and propylene glycol; Lactylic esters of fatty acids; Lard glycerides; Licorice; Licorice extract; Licorice root extract; Methyl ethyl cellulose; Methyl glucoside-coconut oil ester; Microcrystalline cellulose; Mono- and diglycerides of fatty acids; Mono- and diglycerides; sodium phosphate derivatives; Nonoxynol-10; Nonoxynol-11 Palm glyceride; Palm oil sucroglyceride; Pea protein concentrate; PEG-32 dilaurate; PEG-75 dilaurate; PEG-150 dilaurate; PEG-6 dioleate; PEG-20 dioleate; PEG-32 dioleate; PEG-75 dioleate; PEG-150 dioleate; PEG-6 distearate; PEG-20 distearate; PEG-32 distearate; PEG-75 distearate; PEG-32 laurate; PEG-6 oleate; PEG-8 oleate; PEG-32 oleate; PEG-75 oleate; PEG-80 sorbitan laurate; PEG-20 sorbitan tritalate; PEG-32 stearate; PEG-75 stearate; Phosphatidylcholine; Poloxamer 105; Poloxamer122; Poloxamer 123; Poloxamer 124; Poloxamer 181; Poloxamer 182; Poloxamer 183; Poloxamer 184; Poloxamer 185; Poloxamer 188; Poloxamer 331; Poloxamer 333; Poloxamer 334; Poloxamer 335; Poloxamer 338; Poloxamer 401; Poloxamer 402; Poloxamer 403; Poloxamer 407; Polyethylene glycol; Polyglyceryl-10 dipalmitate; Polyglyceryl-10 hexaoleate; Polyglyceryl-10 stearate; Polysorbate 20; Polysorbate 40; Polysorbate 60; Polysorbate 80; Polysorbate 85; Poly(1-vinyl-2-pyrrolidinone) homopolymer; Potassium acid tartrate; Potassium persulfate; Potassium tripolyphosphate; Propylene glycol; Propylene glycol alginate; PVP Quilfala Simethicone; Sodium acid pyrophosphate; Sodium decylbenzane sulfonate; Sodium glyceryl oleate phosphate; Sodium lauryl sulfate; Sodium stearoyl lactylate; Sorbitan sesquiloleate; Sorbitan tritaliate; Sucrose dilaurate; Sucrose distearate; Sucrose erucate; Sucrose laurate; Sucrose myristate; Sucrose stearate; Sucrose tribehanate; Sunflower seed oil glycerides Tallow glycerides; Tetrapotassium pyrophosphate; Tetrasodium pyrophosphate Xanthan gum; Yucca.

The following Examples of formulations exemplify the inventive concepts and provide a best mode.

EXAMPLE 1

| H-1 Raw Material | % Weight |
|---|---|
| Glycerin (96% active) | 75.7 |
| DI Water | 20.3 |
| Lambert E-2175 Silicone emulsion | 2 |

EXAMPLE 2

| H-1 Raw Material | % Weight |
|---|---|
| Glycerin (96% active) | 77.24 |
| DI Water | 20.71 |
| Lambert E-2175 Silicone emulsion | 2.05 |

EXAMPLE 3

| H-1 Raw Material | % Weight |
|---|---|
| Glycerin (96% active) | 77.95 |
| DI Water | 20.1 |
| Mineral Seal Oil (White Oil) | 4.95 |

EXAMPLE 4

| H-1 Raw Material | % Weight |
|---|---|
| Glycerin (96% active) | 77.24 |
| DI Water | 20.71 |
| Mineral Seal Oil (White Oil) | 2.05 |

EXAMPLE 5

| H-1 Raw Material | % Weight |
|---|---|
| Glycerin (96%) | 56.76 |
| Lambert E-2140-FG Silicone emulsion | 1.54 |
| DI Water | 41.7 |

EXAMPLE 6

| H-1 Raw Material | % Weight |
|---|---|
| Glycerin (96%) | 55.66 |
| Lambert E-2175 Silicone emulsion | 1.47 |
| DI Water | 42.87 |

The following materials can be made:

EXAMPLE 7

| H-1 Raw Material | % Weight |
|---|---|
| $C_{10-16}$ Fatty acid mixture, potassium salt | 2 |
| Polyethylene glycol (PEG 24) | 10 |
| Polysorbate surfactant (TWEEN 20) | 0.1 |
| water | 87.9 |

EXAMPLE 8

| H-1 Raw Material | % Weight |
|---|---|
| $C_{10-16}$ Fatty acid mixture, potassium salt | 3 |
| Polyethylene glycol dioleate (PEG 32) | 12 |
| Polysorbate surfactant (TWEEN 40) | 0.1 |
| Polysorbate 40; $EO_{40}$ Sorbate laurate ester water | 84.9 |

EXAMPLE 9

| H-1 Raw Material | % Weight |
|---|---|
| Poloxamer 284; $EO_{21}PO_{47}EO_{21}$ | 10 |
| polysorbate surfactant (Tween 80) | 2 |
| Polysorbate 80; $EO_{80}$ Sorbate laurate ester Water | 88 |

The materials of Examples 5–6, comprising an H-1 silicone emulsion were blended such that the silicone was in the form of a microemulsion in a continuous aqueous phase containing glycerine. Examples 3 and 4 were agitated until the white oil uniformly dispersed in the continuous aqueous phase containing glycerin.

The product of Example 1 was tested for COF. FIG. 1 is a graphical representation of the friction data arising from the testing done with the Lubricant of Example 1. The results are as follows:

| Lube (Ex. 1) Applied g | COF unitless parameter | Lube Applied g | Lub per unit area g/sq In |
|---|---|---|---|
| 4 | 0.0846 | 4 | 0.002564 |
| 5 | 0.0717 | 5 | 0.003205 |
| 7 | 0.066 | 7 | 0.004487 |
| 10 | 0.0554 | 10 | 0.006410 |
| 15 | 0.0584 | 15 | 0.009615 |
| 20 | 0.0621 | 20 | 0.012821 |

Conveyor surface: 2 × 3.25" × 20 ft = 6.5" × 2012 = 1560 sq. In

The determination of lubricity (Coefficient of friction (COF) of the lubricant was measured on a short track conveyor system. The conveyor was equipped with two belts from Rexnord. The belt was Rexnord LF (polyacetal) thermoplastic belt of 3.25" width and 20 ft long. The lubricant was applied to the dry conveyor surface evenly with a bottle wash brush. The conveyor system was run at a speed of 100 ft/min. Six 2L bottles filled with beverage were stacked in a rack on the track with a total weight of 16.15 kg. The rack was connected to a strain gauge by a wire. As the belts moved, force was exerted on the strain gauge by the pulling action of the rack on the wire. A computer recorded the pull strength.

The belt is allowed to run for about 15 minutes during which time a consistently low COF is observed. The COF is calculated on the basis of the measured force and the mass of the bottles, averaged over the run duration. The lubricant of Example 1 was applied to a moving conveyor at four positions that varied along the length of the conveyor belt. At the first station A, a relatively larger amount of lubricant was added to the conveyor to ensure adequate lubrication of the interface between the bottles and the conveyor belt. At stations B, C and D, relatively less amounts of lubricant was added to the conveyor to maintain adequate lubrication. The application apparatus was monitored to measure consistency of application of the lubricant. As shown in the following table, the apparatus of the invention applied a controlled, but effective, amount of lubricant to the conveyor belt in a controlled effective add-on amount. This table demonstrates the ability of the equipment of the invention to add relatively larger amounts of lubricant up to 3 grams of lubricant per minute down to a relatively small amount of lubricant, less than 0.4 gram of lubricant per minute where desired and maintain the lubricant add-on at a consistent amount over an extended period of time. FIG. 6 is a graphical representation of the lubricant add-on data from this table.

| Day | Position A | Position B | Position C | Position D |
|---|---|---|---|---|
| 1 | 2.62 | 1.22 | 0.71 | 0.36 |
| 2 | 2.63 | 1.29 | 0.81 | 0.33 |
| 3 | 2.43 | 1.13 | 0.64 | 0.36 |
| 4 | 2.47 | 1.12 | 0.68 | 0.32 |
| 5 | 2.60 | 1.32 | 0.72 | 0.32 |

In a similar experiment to the work leading to the consistency data of FIG. 6, the frictional character of the spray on technique of the invention was tested. The frictional character of the Rexnord belt was measured. A lubricant similar to that of Example 1 was applied with a conventional brush teqnique. Lastly the lubricant was applied as described in a small particle spray. The frictional results are in FIG. 7 showing a substantial advantage for the spray on technique. In the figure the friction as measured by COF drops form 0.55 in the brush mode to 0.45 in the spray mode. The unlubricated belt measured about 0.6. This advantage appears to result from the nature of the lubricating films formed by the spray. Such a frictional reduction permits increased conveyor speeds, reduced lubricant use and improved product.

DETAILED DESCRIPTION OF THE DRAWINGS

FIG. 1 is a depiction of one embodiment of an apparatus to generate the finely divided particulates of lubricants of the invention. In FIG. 1, a conveyor 10 is contacted with a finely divided distribution of lubricant 11 in air which falls onto the conveyor 10 leaving, at a minimum, a distribution of a pattern of droplets on the moving conveyor 10. The conveyor can obtain either a continuous thin film of lubricant 13 for the divided pattern of lubricant droplets. The divided particulates of lubricant in air 11 is produced by a mechanism comprising a manifold 14, a lubricant supply 15 and an air supply 16. Within the manifold, the air, at a defined but surprisingly low pressure and flow rate, exits a nozzle (not shown) having a diameter of less than about 0.5 inch to create a flow of air through the manifold 14. The lubricant flows through conduit 15 into fitting 17 and through a lubricant nozzle to create a stream of the lubricant. Within the manifold, the lubricant flow is directed into the air flow. At the interface, between the air flow and the lubricant flow, the shear on the lubricant liquid caused by the incidents of the air stream causes the relatively large flow or stream of lubricant to be broken into particles of the appropriate size and distribution in the air flow. The finely divided particulates exit the apparatus through nozzle 18 and are directed onto the conveyor 10 under the influence of gravity. The particulates are sized such that the particulates, under the influence of gravity, are directed to the conveyor surface. Little, if any, lubricant is lost into the air in the form of mist or fog that can be supported by air and directed away from the lubricant surface. Further, the apparatus is operated in a manner such that virtually all the lubricant leaving the nozzle forms a lubricating layer on the conveyor surface.

FIG. 2 is an alternate embodiment of the apparatus producing the finely divided stream of lubricant particulates. In FIG. 2, a moving conveyor 10 obtains either a continuous film 13 or a distributed pattern of lubricant 12 to convey work pieces (not shown). In the embodiment of FIG. 2, the liquid lubricant passes through conduit 15 into a line 20 that forms relatively large droplets 21 of liquid lubricant. An air stream passes through conduit 16 into manifold 14 and passes through nozzle 18 creating an air flow which contacts liquid droplet 21 forming the finely divided distribution of droplets 11. The flow rates of the lubricant and air are configured such that virtually all the finely divided lubricant 11 is directed to the conveyor surface 10 in the form of the continuous film 13 or the finely divided distribution 12.

Figure 3:
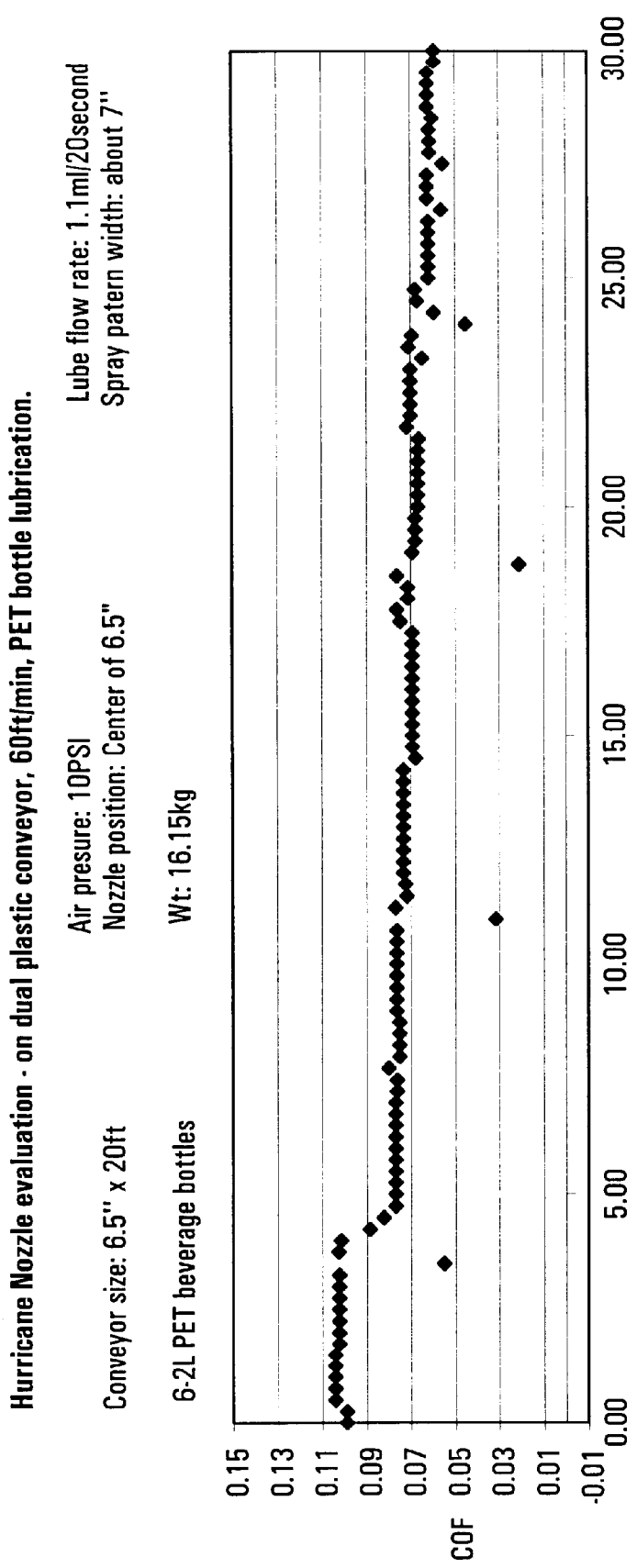

FIGS. 3 and 4 demonstrate data obtained from the conveyor tests described in the body of the specification. In FIG. 3, a formula comprising 77.24 wt % of a 98% active glycerin, 2.05% of Lambert E-2175 silicone emulsion and about 20.71 wt % of deionized water were blended and applied using the spray methods of the invention to the test conveyor device as described. In FIG. 3, a graph is shown with an initial trace representing the absence of lubricant and a relatively high friction environment. After the application of the lubricant for 20 seconds, the coefficient of friction drops substantially. As the lubricant is added incrementally in 10 and 40 second additions, the coefficient of friction drops with the addition of the lubricant.

In FIG. 4, the effective lubricant volume on coefficient of friction is shown. As the amount of lubricant applied increases, the coefficient of friction drops. There appears to be a limit coefficient of friction that is reached between 0.04 and 0.06 coefficient of friction.

FIG. 5 shows the relationship between a lubricant spray device of the invention and a bottle conveyor system. In FIG. 5, a spray apparatus 500 is shown containing conveyor 508 supporting bottles 501. Onto the conveyor is sprayed the lubricant composition (not shown). The lubricant is produced by carefully metering liquid lubricant from lubricant outlet 502. As the lubricant is metered from outlet 502, it contacts an air stream (not shown) exiting air outlet 504. The air from outlet 504 contacts the lub from lub outlet 502, the air shears the lub into a uniform spray of fine droplets that contacts the conveyor 508. The amount of lubricant exiting lub outlet 502 is controlled by an adjustable valve 503 that can be adjusted for controlled add-on. The lubricant outlet 502 and the air outlet 504 are mounted on a bracket 506 positioned above the conveyor 508. The bracket is positioned such that the interaction between the lubricant leaving the lub outlet 502 and the air leaving the air outlet 504 produces an even distribution of droplets over the conveyor 508. Such positioning is obtainable using a bendable bracket 508 or a flexible member 508. In FIG. 5, the lubricant leaves nozzle 502 at an angle that departs from a line drawn normal to the surface of the conveyor. Similarly, the air leaving air outlet 504 exits the outlet 504 at an angle that is not parallel with the surface of the conveyor. In FIG. 5 is shown an angle alpha which angle comprises the difference between a line drawn normal to the surface of the conveyor and the angle of the discharge opening of the lubricant outlet 502. Angle beta is also shown in FIG. 5 which angle represents the difference between the surface of the conveyor and the line drawn through the air outlet 504. The interaction between the air and the lubricant provides a droplet of the correct size while the positioning of the outlets 502 and 504 above the conveyor at the appropriate angle provides a substantially uniform add-on of spray lubricant to the load bearing surface of the conveyor 508.

In an experiment to compare coefficient of friction between bottle and conveyor using various lubricant technologies, the conveyor was lubricated using conventional lubricant additive techniques. Care was taken to lubricate the conveyor in the manner associated with the conventional techniques while the spray on was sprayed on as described above. Under normal conventional operating conditions, the conventional lubricant obtained greater than 0.6 coefficient of friction, the brush on application obtained greater than 0.55 coefficient of friction while the spray on touchless technology obtained a coefficient of friction of about 0.45.

We claim:

1. A method to lubricate an interface between a conveyor surface and a work piece, the method comprising:
   (a) establishing a flow of air, at a pressure of about 0.1 to 10 psi, through a nozzle with an aperture with a diameter of less than 0.05 inch and contacting that flow of air with an intersecting flow of liquid lubricant to form a finely divided flow of lubricant; and
   (b) controlling the air flow and lubricant stream such that the lubricant is directed onto at least a portion of the conveyor surface and establishing a coefficient of friction between the conveyor and the work piece of less than about 0.14.

2. The method of claim 1 wherein lubricant is added at a flow rate of about 0.1 to 20 milliliters-sec$^{-1}$.

3. The method of claim 1 wherein with a particle size of the lubricant is about 100 to 5000 microns.

4. The method of claim 1 wherein with a diameter of the aperture is less than 0.05 inch.

5. The method of claim 1 wherein at least 90% of the lubricant is directed onto the conveyor surface.

6. The method of claim 1 wherein the lubricant is added to the conveyor at an add on rate of about $5 \times 10^4$ gms-in$^{-2}$ to 0.05 gm-in$^{-2}$.

7. The method of claim 1 wherein lubricant layer is less than 3 mm in thickness and the conveyor width is about 10 centimeters to 4 meters.

8. The method of claim 1 wherein the lubricant forms a pattern of lubricant leaving an unlubricated border of greater than about 1 millimeter on the conveyor.

9. The method of claim 1 wherein the work piece comprises a glass, plastic, metal or paper container.

10. The method of claim 1 wherein the plastic container comprises a polyester beverage container.

11. The method of claim 1 wherein the lubricant flow comprises about 11 to 22 milliliters per hour and the air flow is at an angle parallel to the conveyor.

12. The method of claim 1 wherein the lubricant flow comprises about 0.5 to 5 milliliters per hour and is at an angle that departs from the surface of the conveyor by at least 5°.

13. The method of claim 1 wherein the add-on rate of the lubricant is about $2 \times 10^{-4}$ gms-in$^{-2}$ to 0.01 gms-in$^{-2}$.

14. The method of claim 1 wherein the stream of lubricant comprises two or more lubricant streams in the form of droplets.

15. The method of claim 1 wherein the lubricant pattern is substantially uniform in that no arbitrary selected square centimeter of conveyor surface comprises more than 125% of the average lubricant add on on a conveyor surface of about 5 square meters.

16. The method of claim 1 wherein the particle size of the resulting finely divided flow of lubricant is about 500 to 2500 microns.

17. A method to form a finely divided distribution of lubricant droplets, the method comprising:
   (a) establishing a flow of air at a pressure of about 0.1 to 5 psi air with an intersecting stream lubricant at a flow rate of about 0.5 to 5 milliliters-sec$^{-1}$ to form a finely divided flow of lubricant with a particle size of about 500 to 2500 microns; and
   (b) controlling the air flow and lubricant stream such that the lubricant is directed onto at least a portion of the conveyor at an add on rate of about $2 \times 10^{-4}$ gm-in$^{-2}$ to 0.01 gm-in$^{-2}$ and establishing a coefficient of friction between the conveyor and less than about 0.14.

18. The method of claim 17 wherein the lubricant layer is les than 1 mm in thickness and the conveyor width is about 20 cm to 1 meter and the lubricant forms a pattern of lubricant leaving an unlubricated border of greater than about 1 millimeter on the conveyor.

19. The method of claim 17 wherein the work piece comprises a plastic, paper or metallic container.

20. The method of claim 17 wherein the plastic container comprises a polyester beverage container.

21. The method of claim 17 wherein the air flow comprises about 10 to 20 milliliters per hour.

22. The method of claim 17 wherein the lubricant flow comprises about 0.5 to 4 milliliters per hour.

23. The method of claim 17 wherein the stream of lubricant comprises two or more lubricant streams in the form of droplets.

24. The method of claim 17 wherein the lubricant pattern is substantially uniform in that no arbitrary selected square centimeter of conveyor surface comprises more than 125% of the average lubricant add within a conveyor surface of about 5 square meters.

25. A lubricated conveyor system for transporting a polyester beverage container from a first work station to a second work station comprising a moving conveyor belt and means for producing a finely divided distribution of droplets of a liquid lubricant, the means comprising an air manifold, an air injection means and a lubricant injection means wherein the conveyor moves at a rate that can convey greater than about 200 bottles per minute, the means for lubricating can add about $5 \cdot 10^{-4}$ to 0.02 gm-in$^{-2}$ of lubricant, the coefficient of friction between the filled polyester beverage container and a lubricated conveyor surface is less than about 0.14.

26. A method to lubricate an interface between a conveyor surface and a work piece, the method comprising:
    (a) establishing a flow of air, at a pressure of about 0.1 to 10 psi, through a nozzle with an aperture with a diameter of less than 0.05 inch and contacting that flow of air with an intersecting flow of liquid lubricant at a flow rate of about 0.1 to 10 milliliters-sec$^{-1}$ to form a finely divided flow of lubricant with a particle size of about 100 to 5000 microns; and
    (b) controlling the air flow and lubricant stream such that 90% of the lubricant is directed onto the conveyor surface at an add on rate of about $5 \times 10^{-4}$ gms-in$^{-2}$ to 0.05 gm-in$^{-2}$ and establishing a coefficient of friction between the conveyor and the work piece of less than about 0.14.

27. The method of claim 26 wherein lubricant layer is less than 3 mm in thickness and the conveyor width is about 10 centimeters to 4 meters.

28. The method of claim 26 wherein the lubricant forms a pattern of lubricant leaving an unlubricated border of greater than about 1 millimeter on the conveyor.

29. The method of claim 26 wherein the work piece comprises a plastic, paper or metallic container.

30. The method of claim 26 wherein the plastic container comprises a polyester beverage container.

31. The method of claim 26 wherein the lubricant flow comprises about 11 to 22 milliliters-sec$^{-1}$ and the air flow is at an angle parallel to the conveyor.

32. The method of claim 26 wherein the lubricant flow comprises about 0.5 to 5 milliliters per hour and is at an angle that departs from the surface of the conveyor by at least 5°.

33. The method of claim 26 wherein the add-on rate of the lubricant is about $2 \times 10^{-4}$ gms-in$^{-2}$ to 0.01 gms-in$^{-2}$.

34. The method of claim 26 wherein the stream of lubricant comprises two or more lubricant streams in the form of droplets.

35. The method of claim 26 wherein the lubricant pattern is substantially uniform in that no arbitrary selected square centimeter of conveyor surface comprises more than 125% of the average lubricant add on on a conveyor surface of about 5 square meters.

36. The method of claim 26 wherein the particle size of the resulting finely divided flow of lubricant is about 500 to 2500 microns.

37. A method to form a finely divided distribution of lubricant droplets, the method comprising:
    (a) establishing a flow of air at a pressure of about 0.1 to 5 psi air with an intersecting stream lubricant at a flow rate of about 0.5 to 5 milliliters-sec$^{-1}$ to form a finely divided flow of lubricant with a particle size of about 500 to 2500 microns; and
    (b) controlling the air flow and lubricant stream such that the lubricant is directed onto at least a portion of the conveyor at an add on rate of about $2 \times 10^{-4}$ gm-in$^{-2}$ to 0.01 gm-in$^{-2}$ and establishing a coefficient of friction between the conveyor and less than about 0.14.

38. The method of claim 37 wherein the lubricant layer is les than 1 mm in thickness and the conveyor width is about 20 cm to 1 meter and the lubricant forms a pattern of lubricant leaving an unlubricated border of greater than about 1 millimeter on the conveyor.

39. The method of claim 37 wherein the work piece comprises a plastic container.

40. The method of claim 37 wherein the plastic container comprises a polyester beverage container.

41. The method of claim 37 wherein the air flow comprises about 10 to 20 milliliters per hour.

42. The method of claim 37 wherein the lubricant flow comprises about 0.5 to 4 milliliters per hour.

43. The method of claim 37 wherein the stream of lubricant comprises two or more lubricant streams in the form of droplets.

44. The method of claim 37 wherein the lubricant pattern, where directed is substantially uniform in that no arbitrary selected square centimeter of conveyor surface comprises more than 125% of the average lubricant add within a conveyor surface of about 5 square meters.

45. A lubricated conveyor system for transporting a polyester beverage container from a first work station to a second work station comprising a moving conveyor belt and means for producing a finely divided distribution of droplets of a liquid lubricant, the means comprising an air manifold, an air injection means and a lubricant injection means wherein the conveyor moves at a rate that can convey greater than about 200 bottles per minute, the means for lubricating can add about $5 \cdot 10^{-4}$ to 0.02 gm-in$^{-2}$ of lubricant, the coefficient of fiction between the filled polyester beverage container and a lubricated conveyor surface is less than about 0.14.

46. A method of lubricating a surface at the interface between a container and a moving conveyor, the method comprising:
    (a) forming a continuous thin coating of a liquid lubricant composition on at least a portion a container contact surface of a conveyor, leaving an edge free of lubricant on the conveyor; and
    (b) moving a container, the container adapted for a food composition, on the container contact surface in order to transport the container from a first location to a second location;
wherein the conveyor obtains about $5 \cdot 10^{-4}$ to 0.02 gm-in$^{-2}$ of lubricant, the coefficient of friction between the filled polyester beverage container and a lubricated conveyor surface is less than about 0.14 during the method of lubricating, and any food composition, coming in direct, incidental or indirect contact with the lubricant, obtains a measurable concentration of the lubricant composition but remains fit for human consumption.

47. The method of claim 46 wherein the lubricant pattern is substantially uniform in that no arbitrary selected square centimeter of conveyor surface comprises more than 125% of the average lubricant add on on a conveyor surface of about 5 square meters.

48. The method of claim 46 wherein the work piece comprises a glass, plastic, metal or paper container.

49. The method of claim 46 wherein the plastic container comprises a polyester beverage container.

50. The method of claim 46 wherein the food comprises a liquid food in an open bottle.

51. The method of claim 46 wherein the food comprises a liquid food in an open can.

52. The method of claim 46 wherein the lubricated container surface can come into direct contact with a user.

53. The method of claim 46 wherein the food comprises a solid food in an open can.

54. The method of claim 46 wherein the food comprises a complex food composition having an aqueous phase and a solid phase in an open carton.

55. The method of claim 53 wherein the food is in the form of a frozen food in an open carton.

56. The method of claim 46 wherein the lubricant comprises an aqueous composition comprising a foodgrade lipid.

57. The method of claim 46 wherein the lubricant comprises an aqueous solution comprising a foodgrade emulsifier.

58. The method of claim 46 wherein the lubricant comprises a foodgrade polymeric thickener composition.

59. The method of claim 46 wherein the lubricant comprises an aqueous composition comprising a foodgrade chelating agent.

60. The method of claim 46 wherein the lubricant composition comprises an aqueous composition comprising a foodgrade surfactant.

61. The method of claim 46 wherein the lubricant comprises an aqueous composition comprising a silicone oil, a mineral oil or mixtures thereof.

62. The method of claim 46 wherein the lubricant composition comprises an effective amount of glycerin and a silicone polymer.

63. The method of claim 46 wherein the lubricant composition comprises glycerin and a white oil.

64. The lubricant of claim 46 wherein the lubricant composition comprises glycerin and a natural oil.

65. The lubricant of claim 64 wherein the natural oil comprises a fatty acid ester.

66. The lubricant of claim 64 wherein the fatty acid is neutralized by sodium hydroxide or potassium hydroxide.

67. The lubricant of claim 46 wherein the natural oil comprises a fatty acid.

68. The method of claim 46 wherein the lubricant comprises an $(EO)_x(PO)_y(EO)_z$ surfactant block copolymer wherein EO represents ethylene oxide residue, PO represents propylene oxide residue, x equals an integer of about 2 to about 100, y equals an integer of about 2 to about 100 and z equals an integer of about 2 to about 100.

69. A business method of food packaging, the method comprises lubricating a surface at the interface between a container and a moving conveyor, the business method comprising steps of:

(a) forming a continuous thin film of a liquid lubricant composition on at least a portion of a container contact surface of a conveyor; and (b) moving a container, the container having a food composition, on the container contact surface in order to transport the container from a first location to a second location wherein the conveyor obtains about $5 \cdot 10^{-4}$ to 0.02 gm-in$^{-2}$ of lubricant, the coefficient of friction between the filled polyester beverage container and a lubricated conveyor surface is less than about 0.14 during the method of lubricating, and any food composition, coming in direct, incidental or indirect contact with the lubricant, obtains a measurable concentration of the lubricant composition but remains fit for human consumption; and wherein the use of food grade additive materials in the lubricant reduces business risk, cost of product replacement or insurance cost.

70. The method of claim 69 wherein the lubricant pattern is substantially uniform in that no arbitrary selected square centimeter of conveyor surface comprises more than 125% of the average lubricant add on on a conveyor surface of about 5 square meters.

71. The method of claim 69 wherein the work piece comprises a glass, plastic, metal or paper container.

72. The method of claim 69 wherein the plastic container comprises a polyester beverage container.

73. The method of claim 69 wherein the food comprises a liquid food in an bottle.

74. The lubricant of claim 69 wherein the lubricant composition comprises glycerin and a natural oil.

75. The lubricant of claim 74 wherein the natural oil comprises a fatty acid ester.

76. The lubricant of claim 74 wherein the fatty acid is neutralized by sodium hydroxide or potassium hydroxide.

77. The lubricant of claim 69 wherein the natural oil comprises a fatty acid.

78. The method of claim 69 wherein the food comprises a beverage in an can.

79. The method of claim 78 wherein the solid food is in the form of a frozen food in an open carton.

80. The method of claim 69 wherein the food comprises a complex food composition having an aqueous phase and a solid phase in an open carton.

81. The method of claim 69 wherein the lubricant comprises an aqueous composition comprising a foodgrade lipid.

82. The method of claim 69 wherein the lubricant comprises an aqueous solution comprising a foodgrade emulsifier.

83. The method of claim 69 wherein the lubricant comprises a foodgrade polymeric thickener composition.

84. The method of claim 69 wherein the lubricant comprises an aqueous composition comprising a foodgrade chelating agent.

85. The method of claim 69 wherein the lubricant composition comprises an aqueous composition comprising a foodgrade surfactant.

86. The method of claim 69 wherein the lubricant comprises an aqueous composition comprising a silicone oil, a mineral oil or mixtures thereof.

87. The method of claim 69 wherein the lubricant composition comprises an effective amount of glycerin and a silicone polymer.

88. The method of claim 69 wherein the lubricant composition comprises glycerin and a white oil.

89. The method of claim 69 wherein the lubricant comprises an $(EO)_x(PO)_y(PO)_z$ surfactant block copolymer wherein EO represents ethylene oxide residue, PO represents propylene oxide residue, x equals an integer of about 2 to about 100, y equals an integer of about 2 to about 100 and z equals a integer of about 2 to 100.

90. The method of claim 46 or 69 wherein the lubricant comprises an aqueous solution comprising a major proportion of water and from about 0.1 to about 10 wt % of a potassium salt of a fatty acid, about 0.1 to about 10 wt % of a polyethylene glycol and about 0.1 to 20 wt % of a polysorbate surfactant comprising fatty acid ester of sorbic acid having from about 5 to about 100 moles of ethylene oxide.

91. The method of claim 46 or 69 wherein the lubricant comprises an aqueous solution comprising a major proportion of water and from about 0.1 to about 10 wt % of a surfactant comprising $(EO)_x(PO)_y(EO)_z$ wherein x, y and z are independently selected from the group of numbers that range from about 2 to about 100; and about 0.1 to 10 wt % of a sorbate surfactant comprising a fatty acid ester of sorbic acid having from about 2 to about 100 moles of ethylene oxide.

92. The method of claim 46 or 69 wherein a residue of the lubricant remains in the food or on the container such that the residue can be ingested by a consumer.

93. The method of claim 46 or 69 wherein the foodgrade lubricant comprises an edible oil.

94. The method of claim 46 or 69 wherein the lubricant composition comprises a silicone oil.

95. A business method of food packaging, the method comprises lubricating a surface at the interface between a container and a moving conveyor, the business method comprising steps of:
  (a) forming a continuous thin film of a liquid lubricant composition on at least a portion of a container contact surface of a conveyor; and
  (b) moving a container, the container adapted for a food composition, on the container contact surface in order to transport the container from a first location to a second location wherein the conveyor obtains about $5 \cdot 10^{-4}$ to 0.02 gm-in$^{-2}$ of lubricant, the coefficient of friction between the filled polyester beverage container and a lubricated conveyor surface is less than about 0.14 during the method of lubricating, and any food composition, coming in direct, incidental or indirect contact with the lubricant, obtains a measurable concentration of the lubricant composition but remains fit for human consumption; and
wherein the use of food grade additive materials in the lubricant reduces business risk, Cost of product replacement or insurance cost.

96. The method of claim 95 wherein the lubricant pattern is substantially uniform in that no arbitrary selected square centimeter of conveyor surface comprises more than 125% of the average lubricant add on on a conveyor surface of about 5 square meters.

97. The method of claim 95 wherein the work piece comprises a glass, plastic, metal or paper container.

98. The method of claim 95 wherein the plastic container comprises a polyester beverage container.

99. The lubricant of claim 95 wherein the lubricant composition comprises glycerin and a natural oil.

100. The lubricant of claim 99 wherein the natural oil comprises a fatty acid ester.

101. The lubricant of claim 95 wherein the fatty acid is neutralized by sodium hydroxide or potassium hydroxide.

102. The lubricant of claim 95 wherein the natural oil comprises a fatty acid.

103. The method of claim 95 wherein the container comprises an open can.

104. The method of claim 95 wherein wherein the container comprises a carton.

105. The method of claim 103 wherein wherein the container comprises an carton.

106. The method of claim 95 wherein the lubricant comprises an aqueous composition comprising a foodgrade lipid.

107. The method of claim 95 wherein the lubricant comprises an aqueous solution comprising a foodgrade additive emulsifier.

108. The method of claim 95 wherein the lubricant comprises a foodgrade additive polymeric thickener composition.

109. The method of claim 96 wherein the lubricant comprises an aqueous composition comprising a foodgrade additive chelating agent.

110. The method of claim 95 wherein the lubricant composition comprises an aqueous composition comprising a foodgrade additive surfactant.

111. The method of claim 95 wherein the lubricant comprises an aqueous composition comprising a silicone oil, a mineral oil or mixtures thereof.

112. The method of claim 95 wherein the lubricant composition comprises an effective amount of glycerin and a silicone polymer.

113. The method of claim 95 wherein the lubricant composition comprises glycerin and a white oil.

* * * * *